(12) United States Patent
Cheng et al.

(10) Patent No.: US 12,352,944 B2
(45) Date of Patent: Jul. 8, 2025

(54) APPARATUS AND METHOD FOR SHORTWAVE INFRARED PHOTOTHERMAL (SWIP) MICROSCOPY

(71) Applicant: Trustees of Boston University, Boston, MA (US)

(72) Inventors: Ji-Xin Cheng, Newton, MA (US); Hongli Ni, Boston, MA (US); Yuhao Yuan, Waltham, MA (US)

(73) Assignee: Trustees of Boston University, Boston, MA (US)

( * ) Notice: Subject to any disclaimer, the term of this patent is extended or adjusted under 35 U.S.C. 154(b) by 0 days.

(21) Appl. No.: 18/906,687

(22) Filed: Oct. 4, 2024

(65) Prior Publication Data
US 2025/0116852 A1 Apr. 10, 2025

Related U.S. Application Data

(60) Provisional application No. 63/542,649, filed on Oct. 5, 2023.

(51) Int. Cl.
*G02B 21/08* (2006.01)
*G01N 21/63* (2006.01)

(52) U.S. Cl.
CPC ........... *G02B 21/08* (2013.01); *G01N 21/636* (2013.01); *G01N 2201/06113* (2013.01)

(58) Field of Classification Search
CPC .............. G02B 21/08; G01N 21/636; G01N 2201/06113
See application file for complete search history.

(56) References Cited

U.S. PATENT DOCUMENTS 9,046,492 B1 6/2015 Prater
2021/0404958 A1 12/2021 Min et al.

FOREIGN PATENT DOCUMENTS

| WO | WO-2020123497 A1 * | 6/2020 | ........... G01N 21/171 |
| WO | 2022221290 A1 | 10/2022 | |
| WO | WO-2024134663 A1 * | 6/2024 | ........... G01N 21/636 |

OTHER PUBLICATIONS

J. Kim, B. K. Koo, J. A. Knoblich, Human organoids: model systems for human biology and medicine. Nat Rev Mal Cell Biol 21, 571-584 (2020).
J. X. Cheng, X. S. Xie, Vibrational spectroscopic imaging of living systems: An emerging platform for biology and medicine. Science 350, aaa8870 (2015).

(Continued)

*Primary Examiner* — David P Porta
*Assistant Examiner* — Fani Polyzos Boosalis
(74) *Attorney, Agent, or Firm* — Cesari and McKenna, LLP; Steven M. Mills

(57) ABSTRACT

A short-wave infrared photothermal (SWIP) microscopy system and method for vibrational imaging of a sample generates shortwave infrared excitation light probe light. The excitation light and the probe light are combined to generate a combined beam, which is focused to generate a focused combined beam, which is directed onto the sample to obtain a SWIP signal generated by absorption-induced thermo-optic selective heating of the sample. The SWIP signal is collected through an aperture in a condenser and detected.

18 Claims, 21 Drawing Sheets

(56) References Cited

OTHER PUBLICATIONS

D. Zhang, C. Li, C. Zhang, N. Slipchenko Mikhail, G. Eakins, J.-X. Cheng, Depth-resolved midinfrared photothermal imaging of living cells and organisms with submicrometer spatial resolution. Science Advances 2, el600521 (2016).
A.H. Hill, B. Manifold, D. Fu, Tissue imaging depth limit of stimulated Raman scattering microscopy. Biomed Opt Express 11, 762-774 (2020).
R. Esposito, G. Scherillo, M. Pannico, P. Musto, S. De Nicola, G. Mensitieri, Depth profiles in confocal optical microscopy: a simulation approach based on the second Rayleigh-Sommerfeld diffraction integral. Opt Express 24, 12565-12576 (2016).
S. Mosca, P. Dey, M. Salimi, B. Gardner, F. Palombo, N. Stone, P. Matousek, Spatially Offset Raman Spectroscopy-How Deep? Anal Chem 93, 6755-6762 (2021).
S. Mosca, C. Conti, N. Stone, P. Matousek, Spatially offset Raman spectroscopy. Nature Reviews Methods Primers 1, 21 (2021).
M. V. Schulmerich, J. H. Cole, K. A. Dooley, M. D. Morris, J.M. Kreider, S. A. Goldstein, S. Srinivasan, B. W. Pogue, Noninvasive Raman tomographic imaging of canine bone tissue. J Biomed Opt 13, 020506 (2008).
J.-L. H. Demers, S. C. Davis, B. W. Pogue, M. D. Morris, Multichannel diffuse optical Raman tomography for bone characterization in vivo: a phantom study. Biomedical Optics Express 3, 2299-2305 (2012).
J. L. Demers, F. W. Esmonde-White, K. A. Esmonde-White, M. D. Morris, B. W. Pogue, Nextgeneration Raman tomography instrument for non-invasive in vivo bone imaging. Biomed Opt Express 6, 793-806 (2015).
R.H. Wilson, K. P. Nadeau, F. B. Jaworski, B. J. Tromberg, A. J. Durkin, Review of short-wave infrared spectroscopy and imaging methods for biological tissue characterization. J Biomed Opt 20, 030901 (2015).
H. W. Wang, N. Chai, P. Wang, S. Hu, W. Dou, D. Umulis, L. V. Wang, M. Sturek, R. Lucht, J. X. Cheng, Label-free bond-selective imaging by listening to vibrationally excited molecules. Phys Rev Lett 106, 238106 (2011).
P. Wang, J. R. Rajian, J. X. Cheng, Spectroscopic Imaging of Deep Tissue through Photoacoustic Detection of Molecular Vibration. J Phys Chem Lett 4, 2177-2185 (2013).
Y. Zhao, A. Pilvar, A. Tank, H. Peterson, J. Jiang, J.C. Aster, J.P. Dumas, M. C. Pierce, D. Roblyer, Shortwave-infrared mesa-patterned imaging enables label-free mapping of tissue water and lipid content. Nat Commun 11, 5355 (2020).
L. V. Wang, J. Yao, A practical guide to photoacoustic tomography in the life sciences. Nat Methods 13, 627-638 (2016).
S. Berciaud, D. Lasne, G. A. Blab, L. Cognet, B. Lounis, Photothermal heterodyne imaging of individual metallic nanoparticles: Theory versus experiment. Physical Review B 73, (2006).
P. Hajireza, W. Shi, K. Bell, R. J. Paproski, R. J. Zemp, Non-interferometric photoacoustic remote sensing microscopy. Light Sci Appl 6, el6278 (2017).
P.H. Reza, K. Bell, W. Shi, J. Shapiro, R. J. Zemp, Deep non-contact photoacoustic initial pressure imaging. Optica 5, (2018).
K. Bell, L. Mukhangaliyeva, L. Khalili, P. Haji Reza, Hyperspectral absorption microscopy using photoacoustic remote sensing. Opt Express 29, 24338-24348 (2021).
G. Hu, Q. Ran, B. W. L. So, M. Li, J. Shi, X. Dong, J. Kang, K. K. Y. Wong, Noncontact photoacoustic lipid imaging by remote sensing on first overtone of the C-H bond. Advanced Photonics Nexus 2, (2023).
N. G. Horton, K. Wang, D. Kobat, C. G. Clark, F. W. Wise, C. B. Schaffer, C. Xu, In vivo threephoton microscopy of subcortical structures within an intact mouse brain. Nat Photonics 7, (2013).
P. Cias, C. Wang, T. S. Dibble, Absorption Cross-Sections of the C-H Overtone of Volatile Organic Compounds: 2 Methyl-1,3-Butadiene (Isoprene), 1,3-Butadiene, and 2,3-Dimethyl-1,3-Butadiene. Applied Spectroscopy 61, 230-236 (2007).
J. Bai, L. Bai, J. Li, Y. Wang, J. Xie, D. Zhang, L. Guo, Sensitivity Analysis of 1,3-Butadiene Monitoring Based on Space-Based Detection in the Infrared Band. Remote Sensing 14, (2022).
J.E. Bertie, Z. Lan, Infrared Intensities of Liquids XX: The Intensity of the OH Stretching Band of Liquid Water Revisited, and the Best Current Values of the Optical Constants ofH2O(1) at 25°C between 15,000 and 1 cm-1. Applied Spectroscopy 50, 1047-1057 (1996).
P. Wang, H. W. Wang, M. Sturek, J. X. Cheng, Bond-selective imaging of deep tissue through the optical window between 1600 and 1850 nm. J Biophotonics 5, 25-32 (2012).
M. Selmke, M. Braun, F. Cichos, Photothermal Single-Particle Microscopy: Detection of a Nanolens. ACS Nano 6, 2741-2749 (2012).
Y. Bai, J. Yin, J.-X. Cheng, Bond-selective imaging by optically sensing the mid-infrared photothermal effect. Science Advances 7, eabgl559 (2021).
S. Adhikari, P. Spaeth, A. Kar, M. D. Baaske, S. Khatua, M. Orrit, Photothermal Microscopy: Imaging the Optical Absorption of Single Nanoparticles and Single Molecules. ACS Nano, (2020).
J. Y. Shin, M.A. Shaloski, F. F. Crim, A. S. Case, First Evidence of Vibrationally Driven Bimolecular Reactions in Solution: Reactions of Br Atoms with Dimethylsulfoxide and Methanol. J Phys Chem B 121, 2486-2494 (2017).
M. Z. Vardaki, N. Kourkoumelis, Tissue Phantoms for Biomedical Applications in Raman Spectroscopy: A Review. Biomed Eng Comput Biol 11, I 179597220948100 (2020).
G. Zaccanti, S. Del Bianco, F. Martelli, Measurements of optical properties of high-density media. Appl. Opt. 42, 4023-4030 (2003).
T. Ishiguro, H. Ohata, A. Sato, K. Y amawaki, T. Enomoto, K. Okamoto, Tumor-derived spheroids: Relevance to cancer stem cells and clinical applications. Cancer Sci 108, 283-289 (2017).
X. Bian, R. Liu, Y. Meng, D. Xing, D. Xu, Z. Lu, Lipid metabolism and cancer. J Exp Med 218, (2021).
S. Kuriu, T. Kadonosono, S. Kizaka-Kondoh, T. Ishida, Slicing Spheroids in Microfluidic Devices for Morphological and Immunohistochemical Analysis. Micromachines (Basel) 11, (2020).
M. Wei, L. Shi, Y. Shen, Z. Zhao, A. Guzman, L. J. Kaufman, L. Wei, W. Min, Volumetric chemical imaging by clearing-enhanced stimulated Raman scattering microscopy. Proc Natl Acad Sci US A 116, 6608-6617 (2019).
S. J. Edwards, V. Carannante, K. Kuhnigk, H. Ring, T. Tararuk, F. Hallbook, H. Blom, B. Onfelt, H. Brismar, High-Resolution Imaging of Tumor Spheroids and Organoids Enabled by Expansion Microscopy. Front Mal Biosci 7, 208 (2020).
F. Pampaloni, N. Ansari, E. H. Stelzer, High-resolution deep imaging of live cellular spheroids with light-sheet-based fluorescence microscopy. Cell Tissue Res 352, 161-177 (2013).
K. Konig, A. Uchugonova, E. Gorjup, Multiphoton fluorescence lifetime imaging of 3D-stem cell spheroids during differentiation. Microsc Res Tech 74, 9-17 (2011).
Y. Yu, P. V. Ramachandran, M. C. Wang, Shedding new light on lipid functions with CARS and SRS microscopy. Biochim Biophys Acta 1841, 1120-1129 (2014).
I. Pradas, K. Huynh, R. Cabre, V. Ayala, P. J. Meikle, M. Jove, R. Pamplona, Lipidomics Reveals a Tissue-Specific Fingerprint. Front Physiol 9, 1165 (2018).
L. Shi, A. A. Fung, A. Zhou, Advances in stimulated Raman scattering imaging for tissues and animals. Quant Imaging Med Surg 11, 1078-1101 (2021).
S. A. Taqi, S. A. Sarni, L.B. Sarni, S. A. Zaki, A review of artifacts in histopathology. J Oral Maxillofac Pathol 22, 279 (2018).
Y. Urasaki, C. Zhang, J. X. Cheng, T. T. Le, Quantitative Assessment of Liver Steatosis and Affected Pathways with Molecular Imaging and Proteomic Profiling. Sci Rep 8, 3606 (2018).
M. S. Singh, A. Thomas, Photoacoustic elastography imaging: a review. J Biomed Opt 24, 1-15 (2019).
L. Streich, J.C. Boffi, L. Wang, K. Alhalaseh, M. Barbieri, R. Rehm, S. Deivasigamani, C. T. Gross, A. Agarwal, R. Prevedel, High-resolution structural and functional deep brain imaging using adaptive optics three-photon microscopy. Nat Methods 18, 1253-1258 (2021).

(56) References Cited

OTHER PUBLICATIONS

S. Hu, L. V. Wang, Optical-resolution photoacoustic microscopy: auscultation of biological systems at the cellularlevel. Biophys J 105, 841-847 (2013).
Y. Tan, J. Li, G. Zhao, K. C. Huang, H. Cardenas, Y. Wang, D. Matei, J. X. Cheng, Metabolic reprogramming from glycolysis to fatty acid uptake and beta-oxidation in platinum-resistant cancer cells. Nat Commun 13, 4554 (2022).
International Search Report an Written Opinion for International Application No. PCT/US2024/049999 filed Oct. 4, 2024 for Trustees of Boston University mailed on Nov. 13, 2024, 13 pages.
Cheng et al., Millimeter-deep micron-resolution vibrational imaging by shortwave infrared photothermal microscopy. Research Square, Oct. 9, 2023 [retrieved on Oct. 21, 2024]. Retrieved from: < URL: https://www.semanticscholar. org/paper/Millimeter-deep-micron-resolution-vibrational-by-Cheng-No/158cdfbc1125d26ef601094e267c0ac7dlb2369a> entire document.

\* cited by examiner

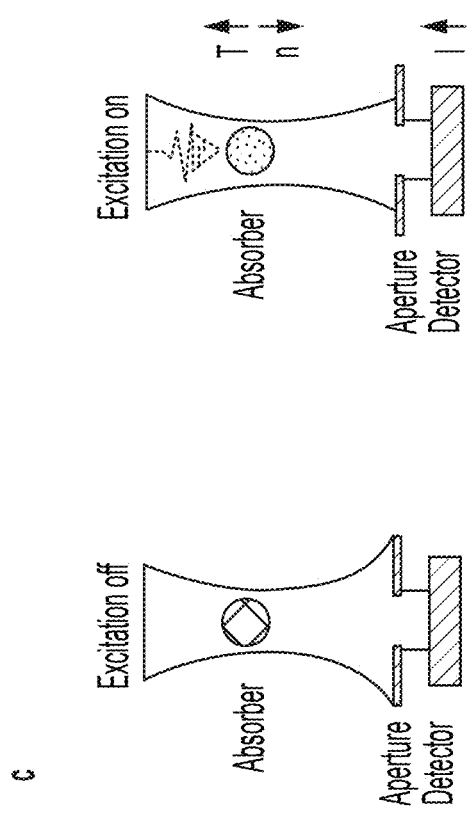
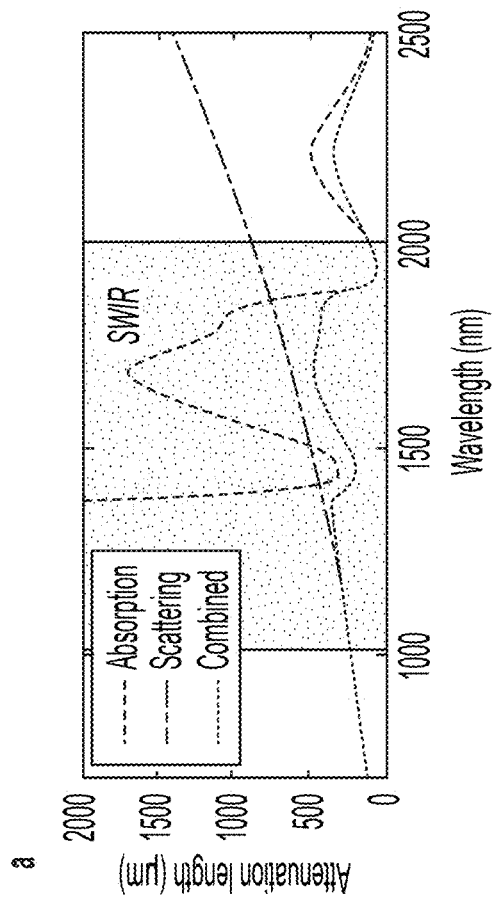
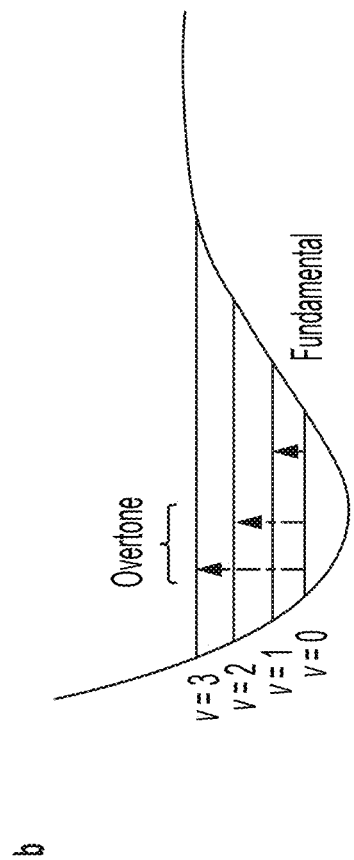
Fig. 1(a)
Fig. 1(b)
Fig. 1(c)

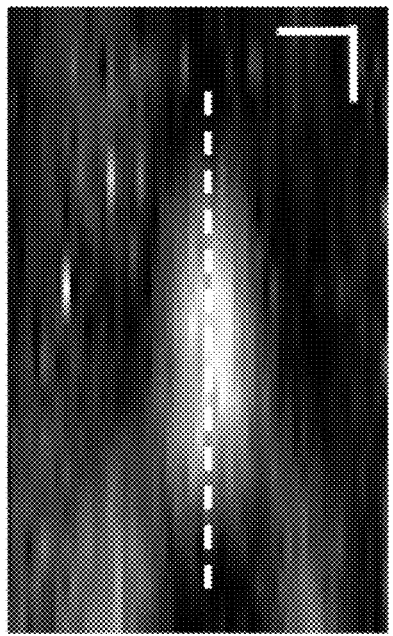
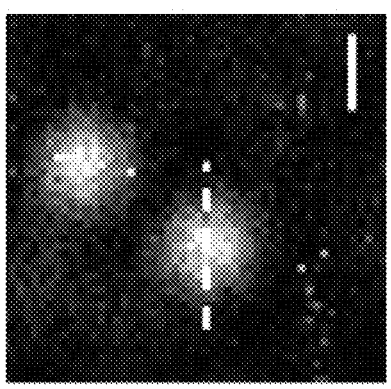
Fig. 3(a)
Fig. 3(b)
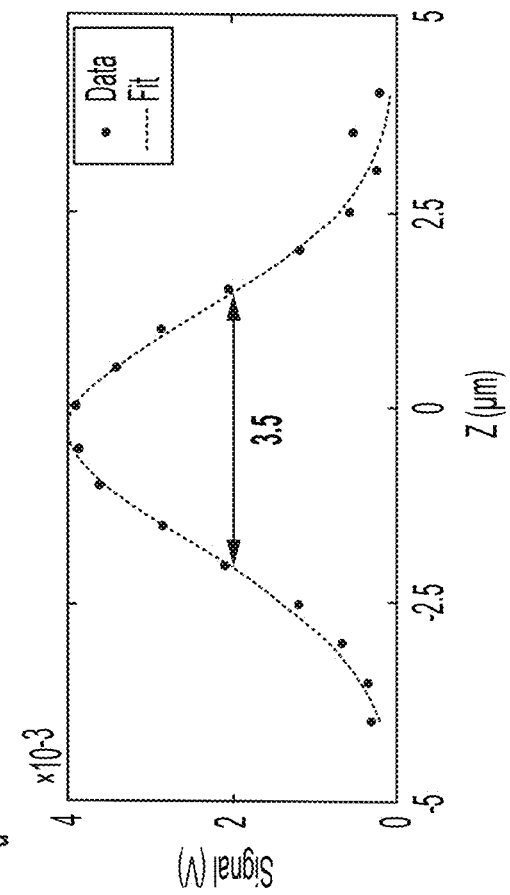
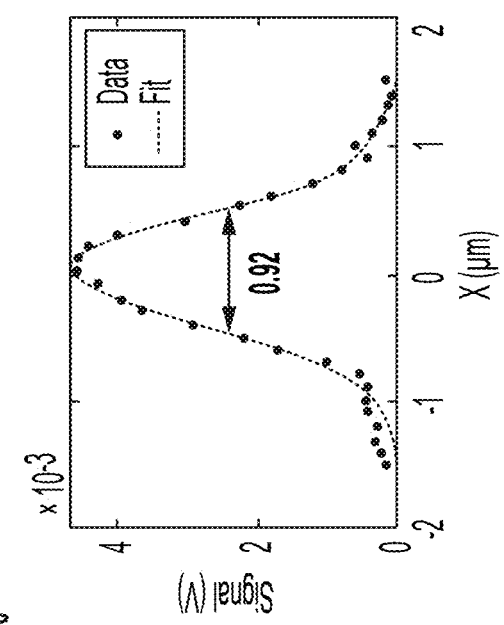
Fig. 3(c)
Fig. 3(d)

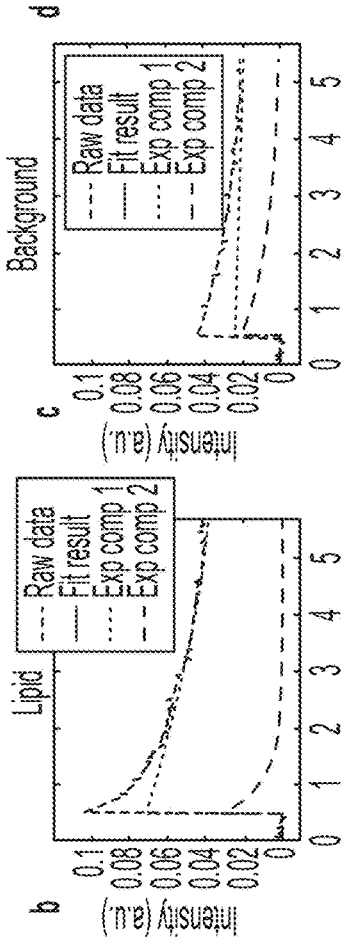
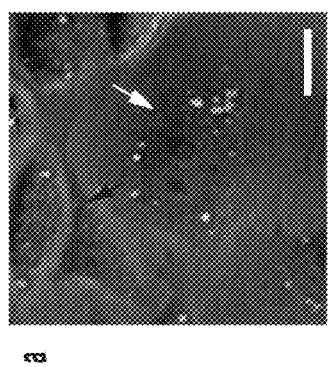
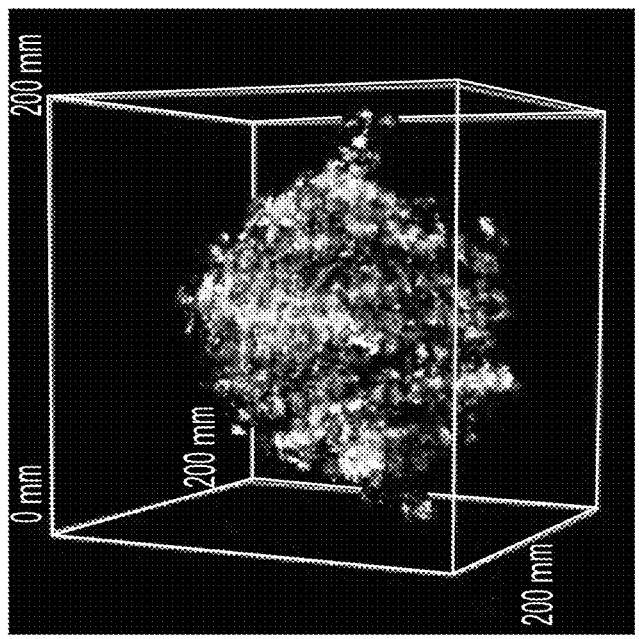
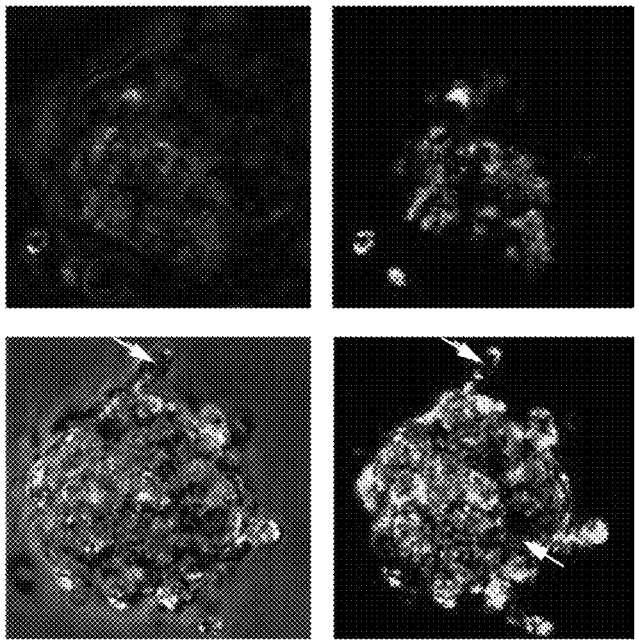
Fig. 4(a) Fig. 4(b) Fig. 4(c) Fig. 4(d) Fig. 4(e) Fig. 4(f)

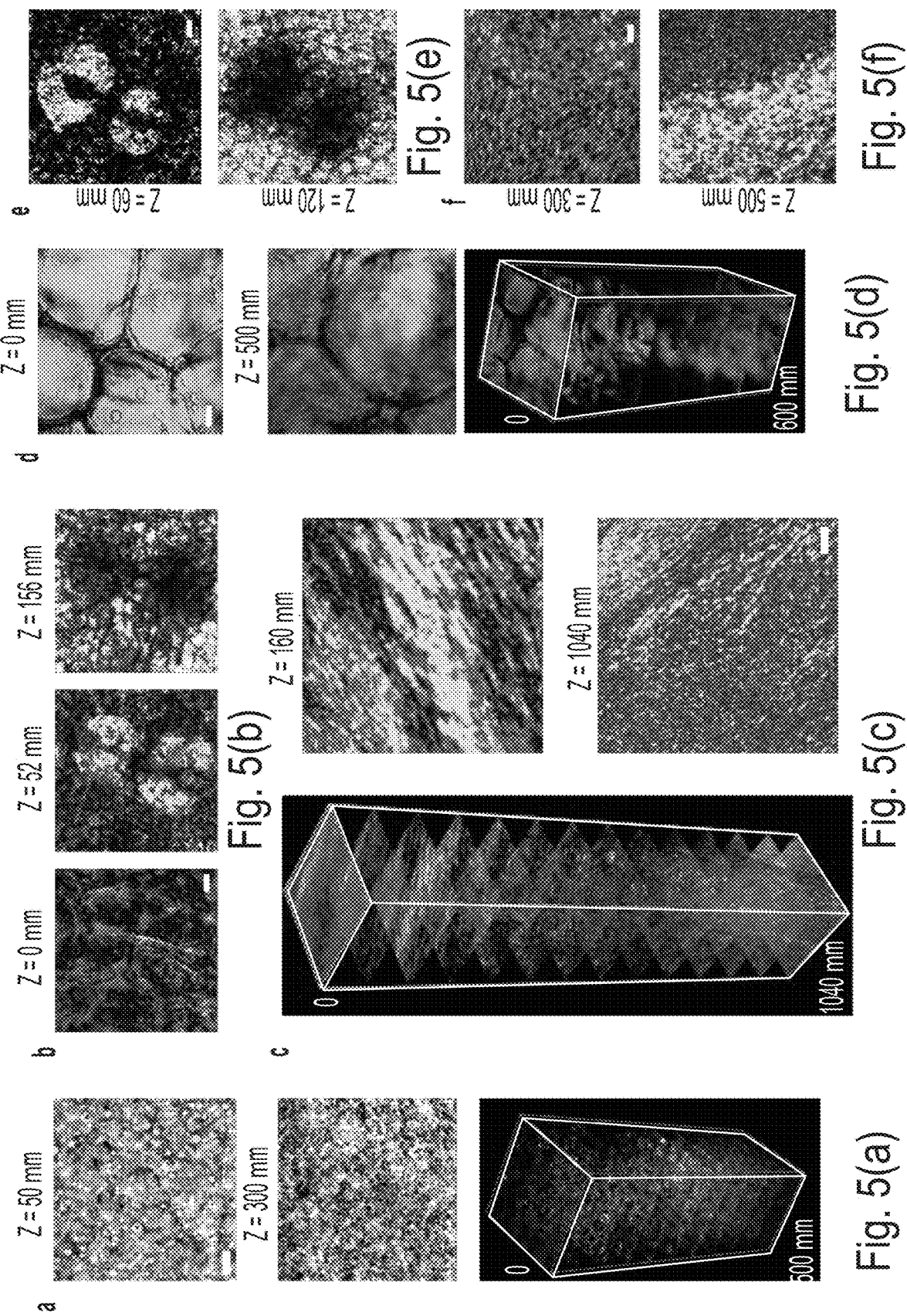

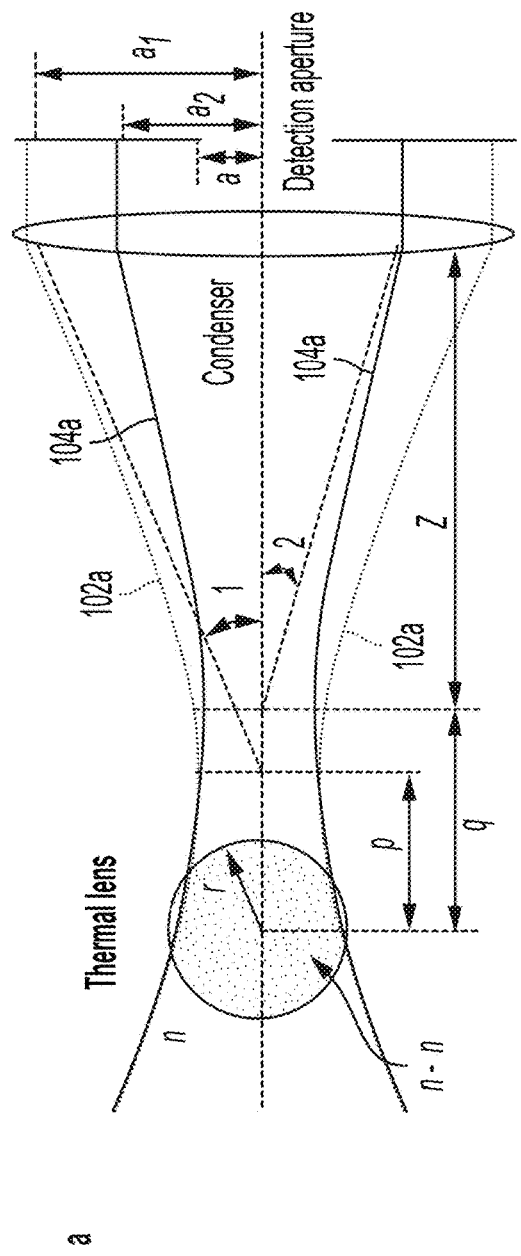
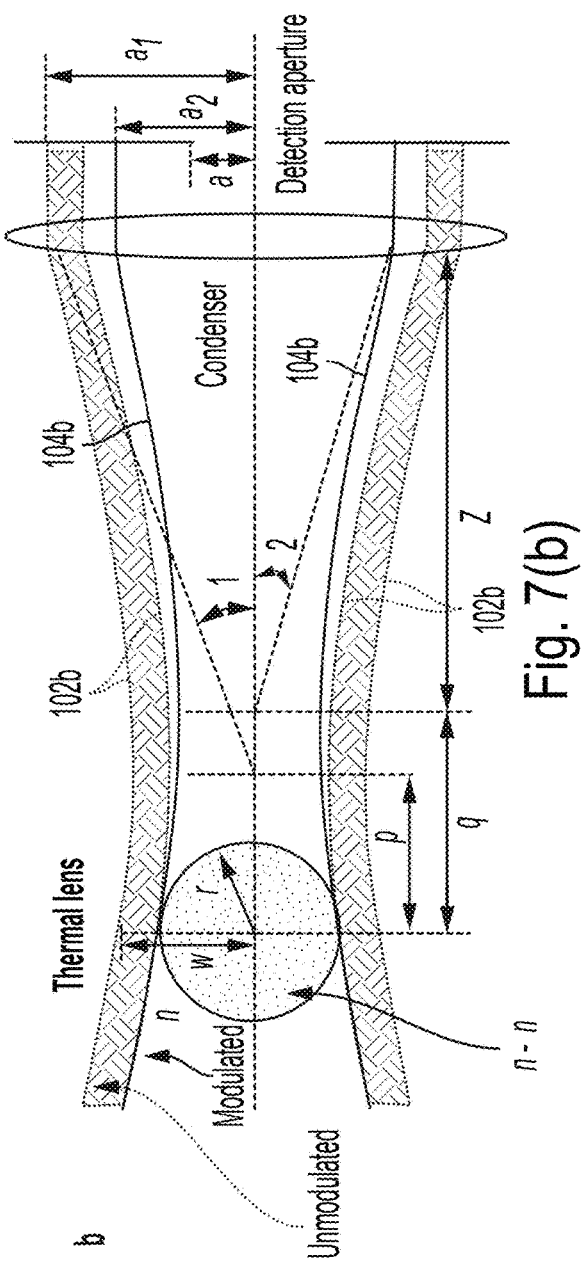
Fig. 7(a)
Fig. 7(b)

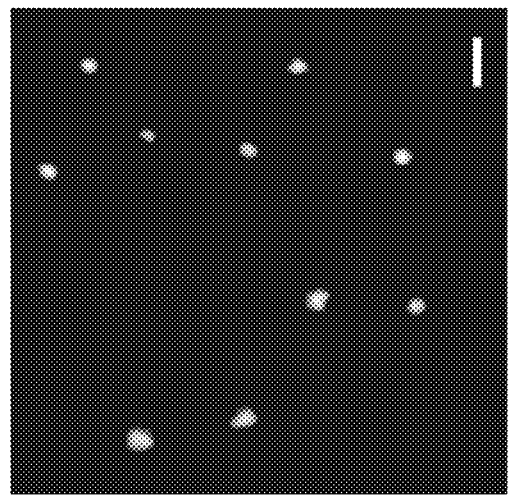
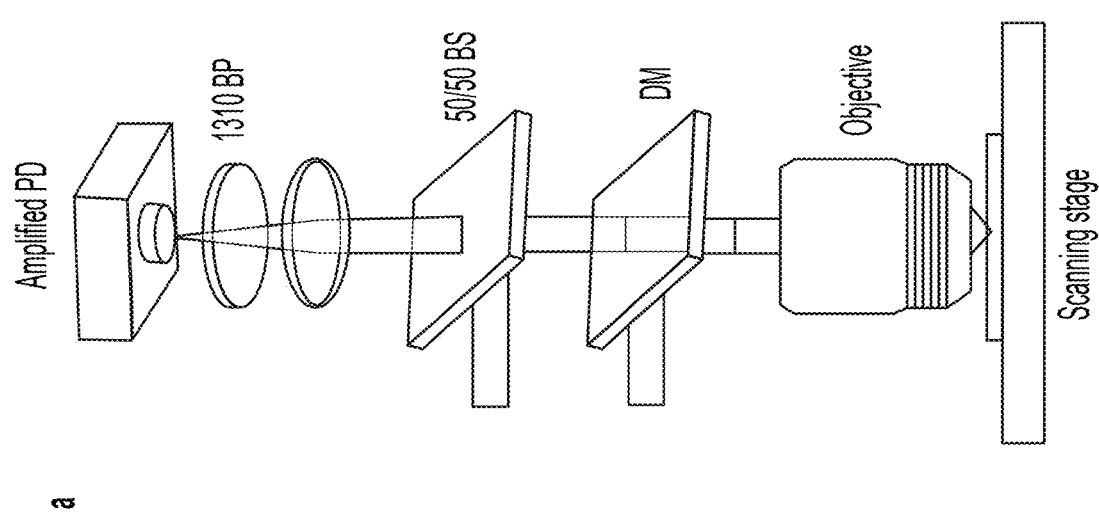
Fig. 18(a)
Fig. 18(b)

APPARATUS AND METHOD FOR SHORTWAVE INFRARED PHOTOTHERMAL (SWIP) MICROSCOPY

CROSS REFERENCE TO RELATED APPLICATIONS

This application claims the benefit of U.S. Provisional Application No. 63/542,649, filed on Oct. 5, 2023, the entire contents of which are incorporated herein by reference.

GOVERNMENT SUPPORT

This invention was made with government support under R01HL125385 and R35GM136223 awarded by the National Institutes of Health. The government has certain rights in the invention.

FIELD OF THE TECHNOLOGY

The subject disclosure relates generally to infrared photothermal microscopy systems and methods and, more particularly, to improvements and enhancements to infrared photothermal microscopy systems and methods.

BACKGROUND OF THE TECHNOLOGY

Probing cellular activities and functions in intact tissue is important for biomedical applications such as cancer pathology and drug discovery. Vibrational microscopy is a powerful tool for studying cellular functions by providing chemical contrast from nutrients, metabolites, and other biomolecules. However, the imaging depth of conventional vibrational microscopy is not sufficient to map the chemical content in intact organoids or tissue without altering the natural microenvironment. Specifically, some infrared spectroscopy-based approaches suffer from strong water absorption which restricts the penetration depth to tens of micrometers. Spontaneous or coherent Raman microscopy with visible or near-infrared excitation has large tissue scattering, limiting their imaging depth to around 100 μm. With detection of diffusively back-scattered photons, spatially offset Raman spectroscopy and spontaneous Raman tomography can acquire signals beyond millimeter-deep in tissue. However, these methods have a millimeter-level spatial resolution, not sufficient to monitor cellular-level activity.

SUMMARY OF THE TECHNOLOGY

According to one aspect, a short-wave infrared photothermal (SWIP) microscopy system for vibrational imaging of a sample is provided. The system includes a source of shortwave infrared light for generating shortwave infrared excitation light and a source of probe light for generating probe light. An optical combining element combines the excitation light and the probe light to generate a combined beam. An objective receives the combined beam and focuses the combined beam to generate a focused combined beam and directs the focused combined beam onto the sample to obtain a SWIP signal generated by absorption-induced thermo-optic selective heating of the sample. A condenser for collects the SWIP signal through an aperture in the condenser. A detection element for detects the SWIP signal from the condenser.

According to another aspect, a short-wave infrared photothermal (SWIP) microscopy method for vibrational imaging of a sample is provided. The method includes: generating shortwave infrared excitation light; generating probe light; combining the excitation light and the probe light to generate a combined beam; receiving the combined beam and focusing the combined beam to generate a focused combined beam; directing the focused combined beam onto the sample to obtain a SWIP signal generated by absorption-induced thermo-optic selective heating of the sample; collecting the SWIP signal through an aperture in a condenser; and detecting the SWIP signal from the condenser.

In some exemplary embodiments, wherein the source of probe light comprises a laser.

In some exemplary embodiments, the probe light is continuous wave (CW) light.

In some exemplary embodiments, the probe light has a wavelength in a range of 400 to 1500 nm. In some exemplary embodiments, the probe light has a wavelength of 1310 nm.

In some exemplary embodiments, the source of the excitation light comprises a laser.

In some exemplary embodiments, the excitation light is pulsed.

In some exemplary embodiments, the excitation light has a wavelength in a range of 1000 nm to 2500 nm. In some exemplary embodiments, the excitation light has a wavelength of 1730 nm.

BRIEF DESCRIPTION OF THE DRAWINGS

FIG. 1(a) includes a graph illustrating wavelength-dependent attenuation length in brain tissue calculated with water absorption and brain tissue scattering coefficients. FIG. 1(b) includes an overtone absorption energy diagram. FIG. 1(c) illustrates a photothermal contrast mechanism, wherein T: temperature, n: refractive index, I: light intensity.

FIG. 4(a) illustrates a raw SWIP image of monolayer OVCAR-5-cisR cells. Red arrow (left): lipid droplets. Blue arrow (right): water area. FIG. 4(b) illustrates a single-pixel SWIP signal trace at the red (left) arrow-pointed lipid area. The fitting result is $f(t)=0.071e^{-0.12t}+0.031e^{-1.96t}$. FIG. 4(c) illustrates a single-pixel SWIP signal trace at the blue (right) arrow-pointed background area. The fitting result $f(t)=0.024e^{-0.045t}+0.020e^{-0.50t}$. FIG. 4(d) illustrates a background rejection result of FIG. 4(a) using the decay characteristic. Red (left) arrow: lipid droplets. Blue (right) arrow: water area. FIG. 4(e) illustrates SWIP imaging of an OVCAR-5-cisR spheroid. FIG. 4(f) illustrates 3-D rendering of volumetric SWIP imaging of the OVCAR-5-cisR spheroid after background rejection.

FIG. 5(a) illustrates SWIP imaging of a fresh swine liver slice. FIG. 5(b) illustrates SWIP imaging of a mouse ear. FIG. 5(c) illustrates SWIP imaging of a mouse brain slice. FIG. 5(d) illustrates SWIP imaging of a breast biopsy from a healthy human. FIG. 5(e) illustrates epi-SWIP imaging of a mouse ear at 60 μm and 120 μm depth. FIG. 5(f) illustrates epi-SWIP imaging of a mouse brain at 300 μm and 500 μm depth.

FIG. 7(a) includes a schematic diagram of detection where the thermal lens is larger or matches the size of the probe focus. FIG. 7(b) includes a schematic diagram of detection where the thermal lens is smaller than the size of the probe focus.

FIG. 11(b) illustrates a single SWIR PAM trace. FIG. 11(c) illustrates SWIR PAM signal intensity dependence on the concentration of DMSO in $D_2O$.

FIG. 12(a) illustrates SWIP intensity dependence on the concentration of DMSO in $D_2O$. FIG. 12(b) illustrates SWIP intensity dependence on the concentration of DMSO in $D_2O$ at the low concentration region (detail box in FIG. 12(a)). FIG. 12(c) illustrates SRS intensity dependence on the concentration of DMSO in $D_2O$. FIG. 12(d) illustrates a zoom-in view of the detail box in FIG. 12(c).

FIG. 15(a) illustrates a scattering phantom imaging schematic. FIG. 15(b) illustrates SWIP imaging of cells and background rejection results through intralipid solution at different concentrations.

FIGS. 17(a)-17(b) illustrate XY and YZ sections of volumetric SWIP image of single 500 nm PMMA bead. FIGS. 17(c)-17(d) illustrate single 500 nm PMMA bead's lateral and axial profile corresponding to dashed lines in FIGS. 17(a)-17(b).

FIGS. 18(a)-18(b) illustrate an epi-detected SWIP microscope. Specifically, FIG. 18(a) includes a schematic functional block diagram of the epi-detected SWIP microscope. FIG. 18(b) illustrates epi-SWIP imaging of 1 μm PS beads under 800 μm-thick 1% intralipid.

DETAILED DESCRIPTION

Deep-tissue chemical imaging plays an important role in biological and medical applications. Current approaches suffer from water absorption and tissue scattering, which limits imaging depth to hundreds of micrometers. The short-wave infrared spectral window allows deep tissue imaging, but typically features unsatisfactory spatial resolution or low detection sensitivity. However, according to the current technology, provided are a shortwave infrared photothermal (SWIP) microscopy system and method for millimeter-deep vibrational imaging with micron lateral resolution. By pumping the overtone transition of carbon-hydrogen bonds and probing the subsequent photothermal lens with shortwave infrared light, SWIP can obtain chemical contrast from one-micron polymer particles located at 800-μm depth in a highly scattering phantom. The amplitude of the SWIP signal is shown to be 63 times larger than the optically probed photoacoustic signal. It is further disclosed herein that SWIP according to the current technology can resolve intracellular lipids across an intact tumor spheroid and the layered structure in thick liver, skin, brain, and breast tissues. SWIP microscopy of the current technology fills a gap in vibrational imaging with sub-cellular resolution and millimeter-level penetration, which provides broad life science and clinical applications.

Figure 1D:
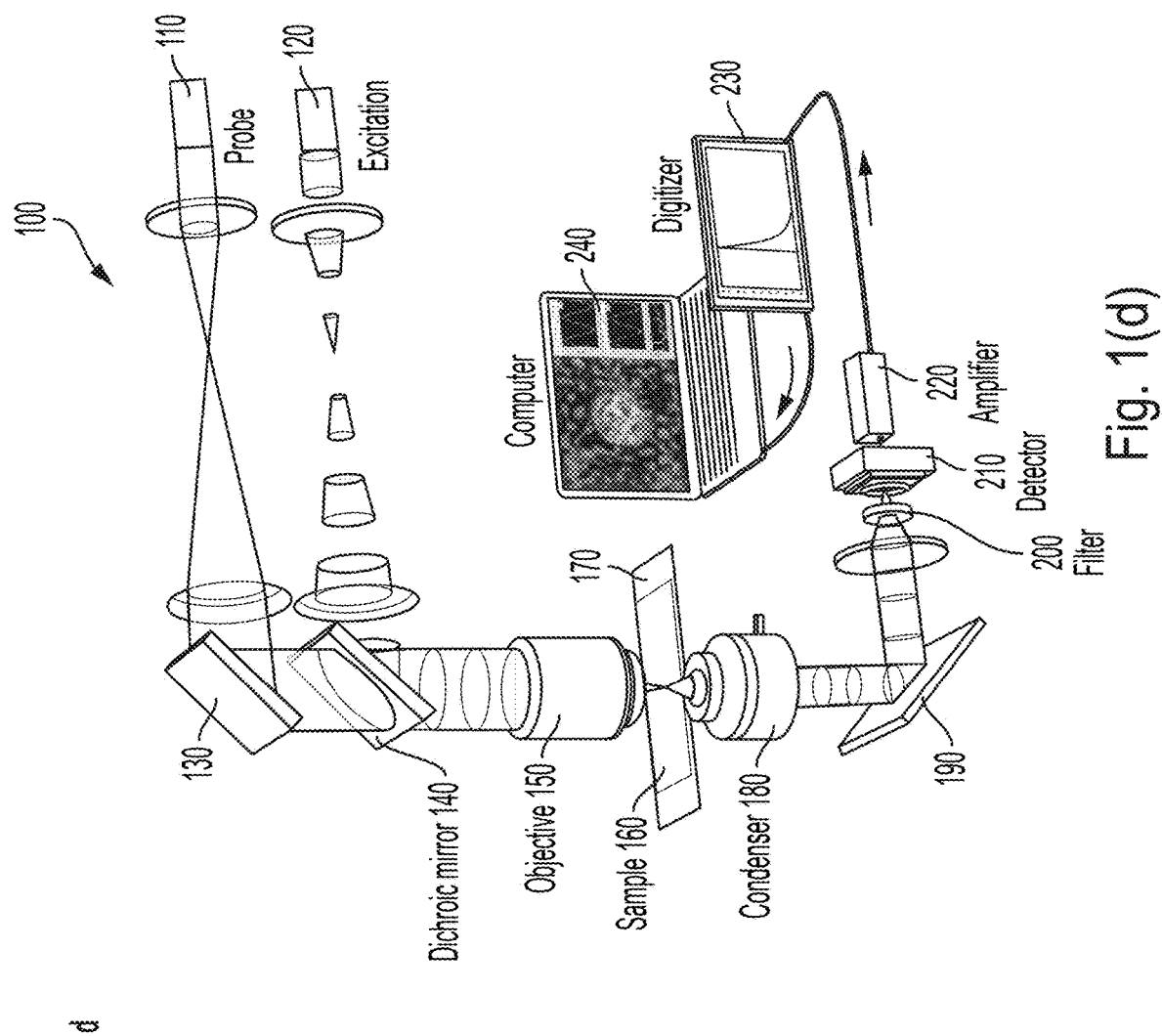
FIG. 1(d) is a schematic functional block diagram of a short-wave infrared photothermal (SWIP) microscope, according to some exemplary embodiments.

FIG. 1(a) includes a graph illustrating wavelength-dependent attenuation length in brain tissue calculated with water absorption and brain tissue scattering coefficients. FIG. 1(b) includes an overtone absorption energy diagram. FIG. 1(c) is a schematic illustration of photothermal contrast mechanism, wherein T: temperature, n: refractive index, I: light intensity. FIG. 1(d) is a schematic functional block diagram of a short-wave infrared photothermal (SWIP) microscope, according to some exemplary embodiments. Referring to FIGS. 1(a) through 1(d), according to the current technology, the shortwave infrared (SWIR) region, i.e., with wavelengths in the range from 1000 to 2000 nm, opens a new window for deep tissue imaging with reduced scattering compared to the visible region and lower water absorption compared to the mid-infrared region, as illustrated in FIG. 1(a). Importantly, the overtone transitions, which are high-order harmonics of the fundamental modes of molecular vibrations (FIG. 1b) reside in this window, allowing deep vibrational imaging. Among various SWIR-modalities, diffuse optical tomography can image beyond millimeter-deep in tissue, yet at millimeter-level spatial resolution. Photoacoustic (PA) imaging achieves a higher spatial resolution by detecting acoustic waves with low tissue scattering. SWIR photoacoustic microscopy (SWIR-PAM) allowed vibrational mapping of lipids in arterial tissues and drosophila embryo. In SWIR-PAM, the transducer is placed at a considerable distance away from the absorption site. Acoustic signal loss takes place during the propagation, which degrades the detection sensitivity and constrains the detected target sizes to tens of micrometers. Additionally, acoustic coupling complicates the optical path design and is not applicable to samples sensitive to mechanical contact such as a patient wound. Optically probed photoacoustic microscopy is developed for a remote sensing purpose and has been extended to the SWIR window. However, the sensitivity of photoacoustic remote sensing is not sufficient for subcellular chemical imaging.

In accordance with the current technology and described in detail and claimed herein are a shortwave infrared photothermal (SWIP) microscopy system and method for subcellular-resolution and millimeter-deep tissue imaging. By optically sensing the refractive index (RI) change directly from the absorption site (FIG. 1(c)), SWIP prevents signal loss during propagation and eliminates the necessity of sample contact. Through a pump-probe approach, SWIP of the current technology achieves subcellular spatial resolution and millimeter-level imaging depth in highly scattering mediums, which allows imaging of single 1-μm polystyrene (PS) beads through 800-μm thick scattering phantom. Furthermore, the photothermal (PT) dynamics enable the detection of small objects over surrounding medium background. With these advances, demonstrated is volumetric SWIP imaging of intracellular lipids in an intact tumor spheroid, thick animal tissue slices, and human breast biopsy.

A Shortwave Infrared Photothermal Microscope

FIG. 1(d) is a schematic functional block diagram of a short-wave infrared photothermal (SWIP) pump-probe microscope system 100, according to some exemplary embodiments. Referring to FIG. 1(d), system 100 includes a 1725 nm pulsed laser source 120 serves as the excitation light source providing the excitation light to target the first overtone absorption of carbon-hydrogen (C—H) vibration. A 1310 nm continuous wave (CW) laser source is used as the probe providing the probe light. The probe beam is reflected by reflective element, e.g., mirror, 130, and the excitation and probe beams are combined by dichroic mirror 140 and focused by objective 150 into sample 160 supported on stage element 170 to obtain the SWIP signal originating from the absorption-induced thermo-optic effect in sample 160. The thermal-modulated refractive index (RI) forms a micro-lens and consequently alters the propagation of the probe laser, which modulates the light intensity collected through a small aperture inside condenser 180. The signal from condenser 180 is reflected by reflective element, i.e., mirror, 190 toward lens and filtering elements 200. The filtered light is detected by detection element or detector 210, which in some exemplary embodiments can be a biased InGaAs photodiode (PD). The detection signal from detector 210 is amplified by an amplifier 220, and the amplified signal is digitized by digitizer 230. The digitized signal is received by computer or processor 240 for processing according to the current technology.

Optically Detected Photothermal Versus Photoacoustic Signal

Under the pulsed excitation of the current technology, photothermal (PT) and photoacoustic (PA) conversions occur simultaneously. Studying the relative amplitudes between the coupled PT and PA signals is valuable in designing the detection scheme. According to a theoretical analysis of PT and PA contribution to the optically probed signal, since both PT and PA signals can be written as a function of temperature rise, an amplitude ratio between optically probed PT and PA signal intensities are calculated as:

$$\frac{I_{PT}}{I_{PA}} = \left|\frac{\delta n_{PT}}{\delta n_{PA}}\right| = \frac{2|\alpha|v_a^3 \tau_{pulse}}{\eta n_0^3 \Gamma C_V r_{focus}} \quad (1)$$

Details of this calculation are provided in the Additional Descriptive Material set forth below.

Referring to Equation (1) above, a is thermo-optic coefficient, $v_a$ is speed of sound, $\tau_{pulse}$ is the pulse duration, η is elasto-optic coefficient, $n_0$ is the initial refractive index (RI) of the sample, Γ is Gruneisen parameter, $C_V$ is constant volume heat capacity, $r_{focus}$ is the radius of probe focus. For olive oil, it is found that $$\frac{I_{PT}}{I_{PA}} \approx 47.$$

(More details in Additional Descriptive Material set forth below.)

Figure 2A:
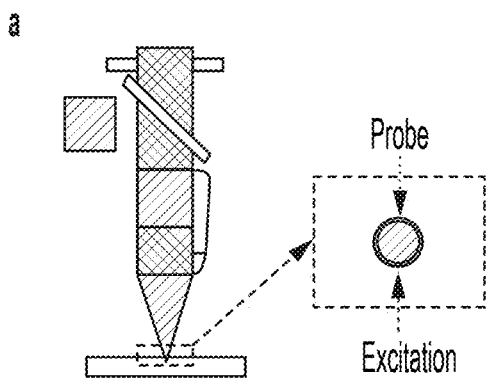
FIG. 2(a) illustrates a normal SWIP focusing configuration where probe and excitation foci have similar size and good lateral overlapping.
Figure 2D:
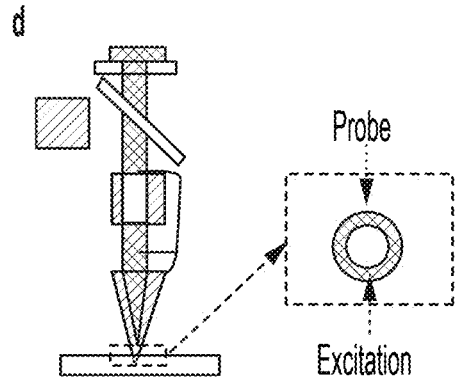
FIG. 2(d) illustrates a focusing configuration where the probe focus is enlarged by reducing the probe beam diameter before the objective, which leads to a reduced effective NA.
Figure 2B:
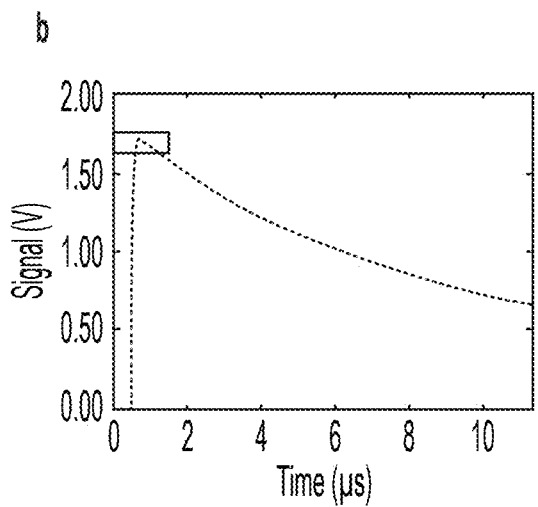
FIG. 2(b) illustrates a signal trace under the configuration in FIG. 2(a).
Figure 2E:
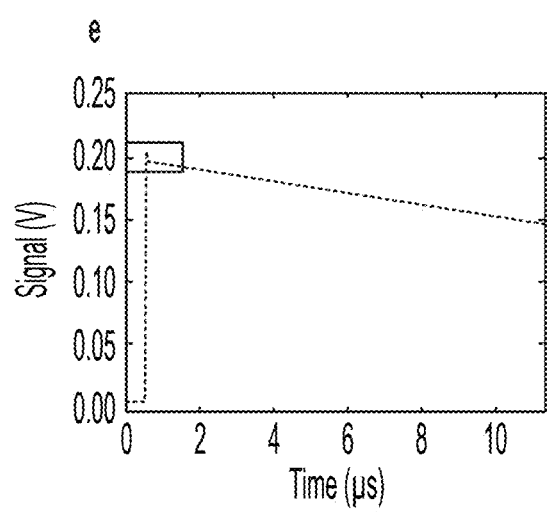
FIG. 2(e) illustrates a signal trace under the configuration in FIG. 2(d).
Figure 2C:
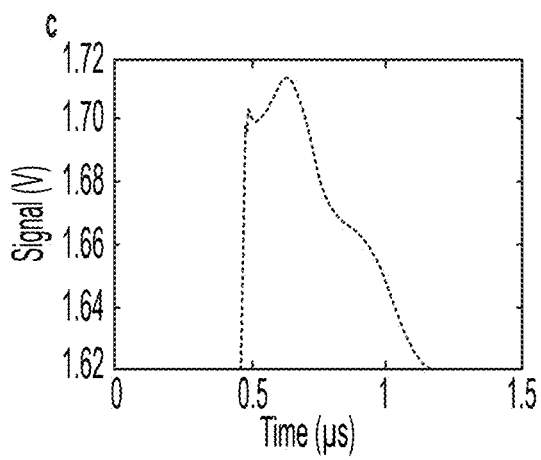
FIG. 2(c) illustrates a zoom-in of FIG. 2(b).
Figure 2F:
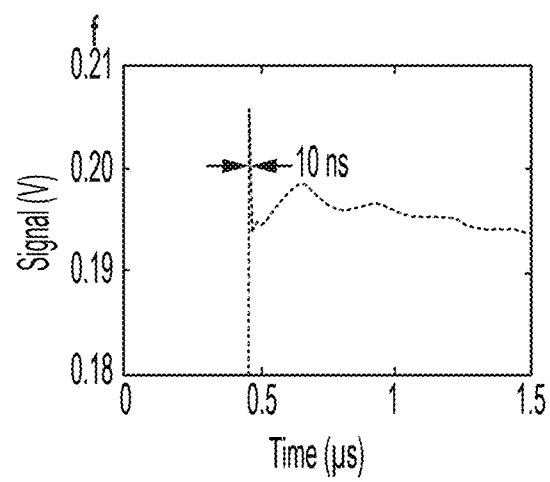
FIG. 2(f) illustrates a zoom-in of FIG. 2(e).
Figure 2G:
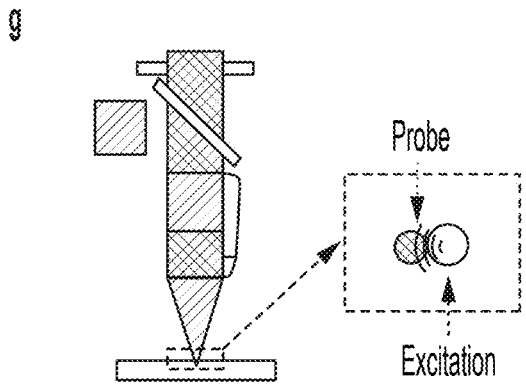
FIG. 2(g) illustrates a focusing configuration where probe focus has a small lateral shift relative to the excitation focus.
Figure 2J:
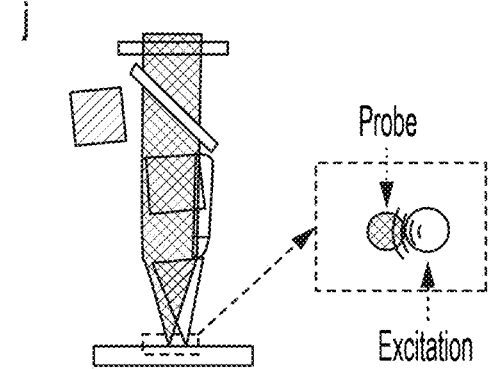
FIG. 2(j) illustrates a focusing configuration where probe focus has a large lateral shift to the excitation focus.
Figure 2H:
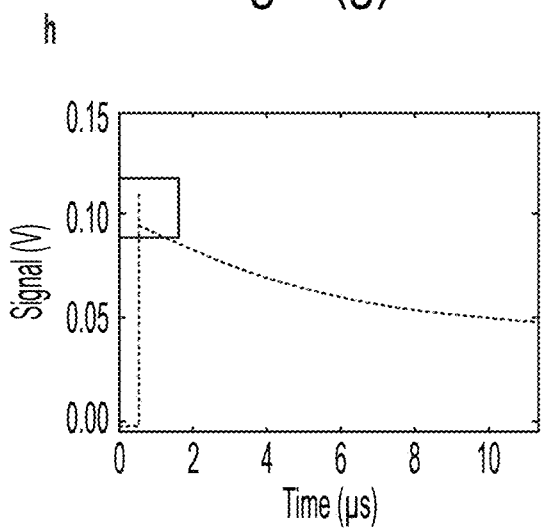
FIG. 2(h) includes a schematic diagram illustrating a signal trace under the configuration in FIG. 2(g).
Figure 2K:
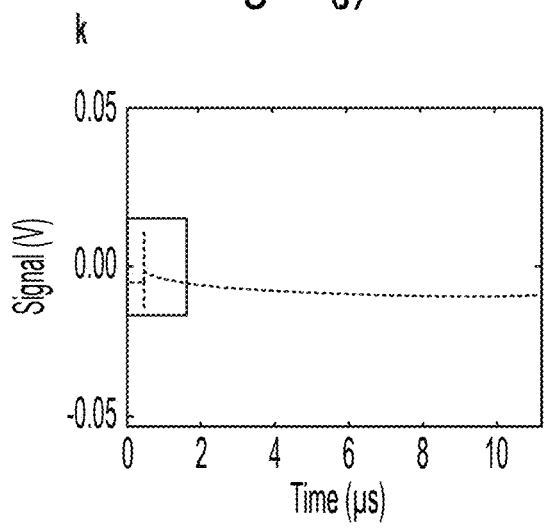
FIG. 2(k) illustrates a signal trace under the configuration in FIG. 2(j).
Figure 2I:
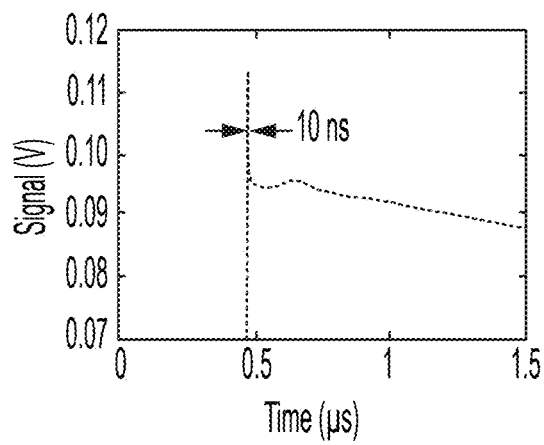
FIG. 2(i) illustrates a zoom-in of FIG. 2(h).
Figure 2L:
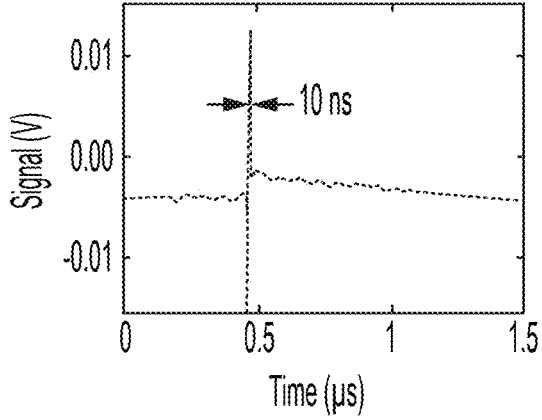
FIG. 2(l) illustrates a zoom-in of FIG. 2(k).

FIG. 2(a) illustrates a normal SWIP focusing configuration where probe and excitation foci have similar size and good lateral overlapping. FIG. 2(b) illustrates a signal trace under the configuration in FIG. 2(a). FIG. 2(c) illustrates a zoom-in of FIG. 2(b). FIG. 2(d) illustrates a focusing configuration where the probe focus is enlarged by reducing the probe beam diameter before the objective, which leads to a reduced effective NA. FIG. 2(e) illustrates a signal trace under the configuration in FIG. 2(d). FIG. 2(f) illustrates a zoom-in of FIG. 2(e). FIG. 2(g) illustrates a focusing configuration where probe focus has a small lateral shift relative to the excitation focus. FIG. 2(h) illustrates a schematic diagram illustrating a signal trace under the configuration in FIG. 2(g). FIG. 2(i) illustrates a zoom-in of FIG. 2(h). FIG. 2(j) illustrates a focusing configuration where probe focus has a large lateral shift to the excitation focus. FIG. 2(k) illustrates a signal trace under the configuration in FIG. 2(j). FIG. 2(l) illustrates a zoom-in of FIG. 2(k). Sample: Olive oil. SWIR excitation power on sample: 4.2 mW.

The calculation indicates PT contributes over one order larger than PA. To validate this result, PA and PT signals were measured simultaneously using the SWIP microscope of the present technology. Through fast digitization, PT and PA contributions can be differentiated by their temporal profiles (FIGS. 2(a)-2(l)). Because the estimated acoustic relaxation time is shorter than the pulse duration, PA initial pressure rise should have the same duration as the excitation pulse, which is 10 ns. In contrast, the PT signal exhibits a long exponential decay as indicated by Newton's law of cooling. When the two foci were tight and in a good lateral overlapping (FIG. 2(a)), the PT signal overwhelmed the PA signal (FIG. 2(b)). A bipolar PA oscillation was observed with an amplitude 63 times smaller than PT (FIG. 2(c)).

To confirm if the initial oscillation signal was from PA, three other signal traces were acquired under different focusing conditions. It is recognized that PT is locally confined and PA propagates according to their diffusion speeds. Therefore, enlarging the probe focus size (FIG. 2(d)) or introducing lateral displacement between two foci (FIGS. 2(g) and 2(j)) should selectively probe the PA signal. Under the modified schemes, the relative amplitude of PA became larger in the detected signal (FIGS. 2(e), 2(h), 2(k)), which could be clearly observed in the zoom-in views (FIGS. 2(f), 2(i), 2(1)). In an extreme case when two foci had little overlap (FIG. 2(j)), the PT contribution in the probed signal became negligible and a typical acoustic bipolar oscillation was observed (FIG. 2(k)-(1)). The width of the strongest PA pulse in FIGS. 2(f), 2(i), 2(1) was around 10 ns, consistent with the initial pressure rise theory. In FIGS. 2(c) and 2(f), the oscillations following the strongest PA pulse represent the low-frequency PA components, whereas the ripples in FIG. 2(i) and FIG. 2(1) are a result of detector noise (More detailed description in the Additional Disclosure Materials, section 3, set forth below). Together, these results confirm the bipolar signal detected in FIG. 2(c) is from PA. A ball-lens model interpreting the SWIP contrast under various focusing conditions is described in detail in the Additional Disclosure Materials, section 1, set forth below.

A slight mismatch is observed between the theoretical calculation and the experimental result, possibly due to the deviation of the elasto-optic coefficient used in the calculation from the real value in the experimental system, or the limited bandwidth of the detector, i.e., photodetector, 70 MHz. Such mismatch does not influence the conclusion that the PT signal has more than one order larger amplitude than the PA signal in the well-overlapped tight-focusing condition.

Figure 9A:
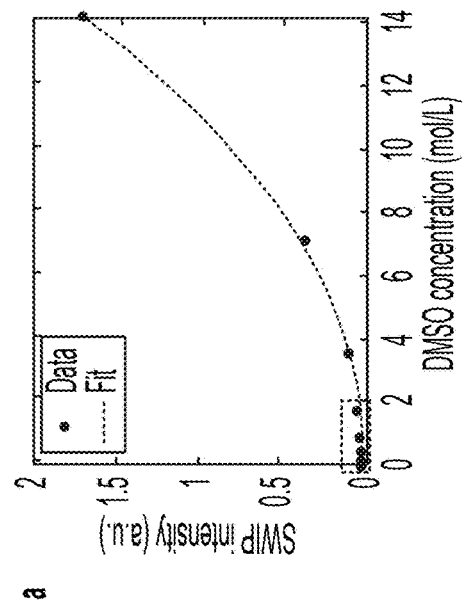
FIG. 9(a) illustrates SWIP intensity dependence on the concentration of DMSO in $D_2O$.
Figure 9B:
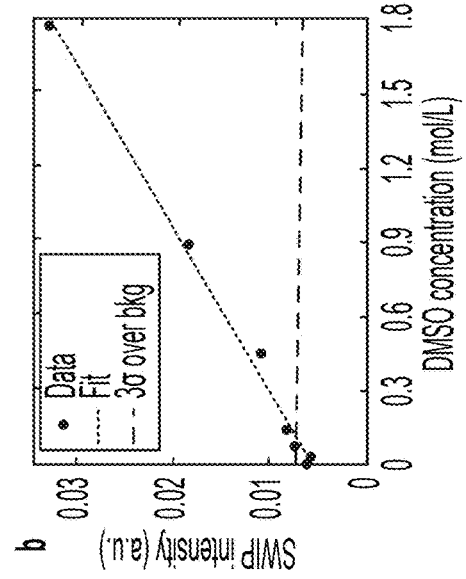
FIG. 9(b) illustrates SWIP intensity dependence on the concentration of DMSO in $D_2O$ at the low concentration region.
Figure 9C:
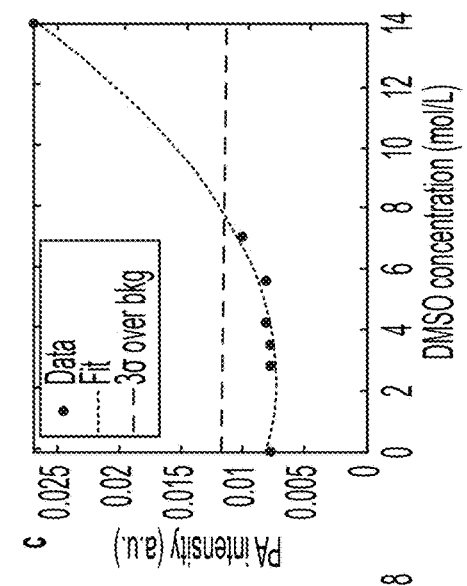
FIG. 9(c) illustrates optically detected PA intensity dependence on the concentration of DMSO in $D_2O$.

To compare the detection sensitivity, we measured SWIP and optically detected PA signal dependence on dimethyl sulfoxide (DMSO) concentration in $D_2O$ (see FIGS. 9(a), 9(b), 9(c)). The limit of detection (LOD—defined hereinbelow) was 112 mM for SWIP of the disclosure and 7.78 M for optically detected PA. Thus, the LOD for SWIP is 69 times better than the LOD for optically detected PA, consistent with the measured amplitude difference on the pure oil sample. Together, the SWIP amplitude is significantly larger than the optically probed PA in the configuration theoretically and experimentally.

SWIP Imaging Characteristics

Figure 3E:
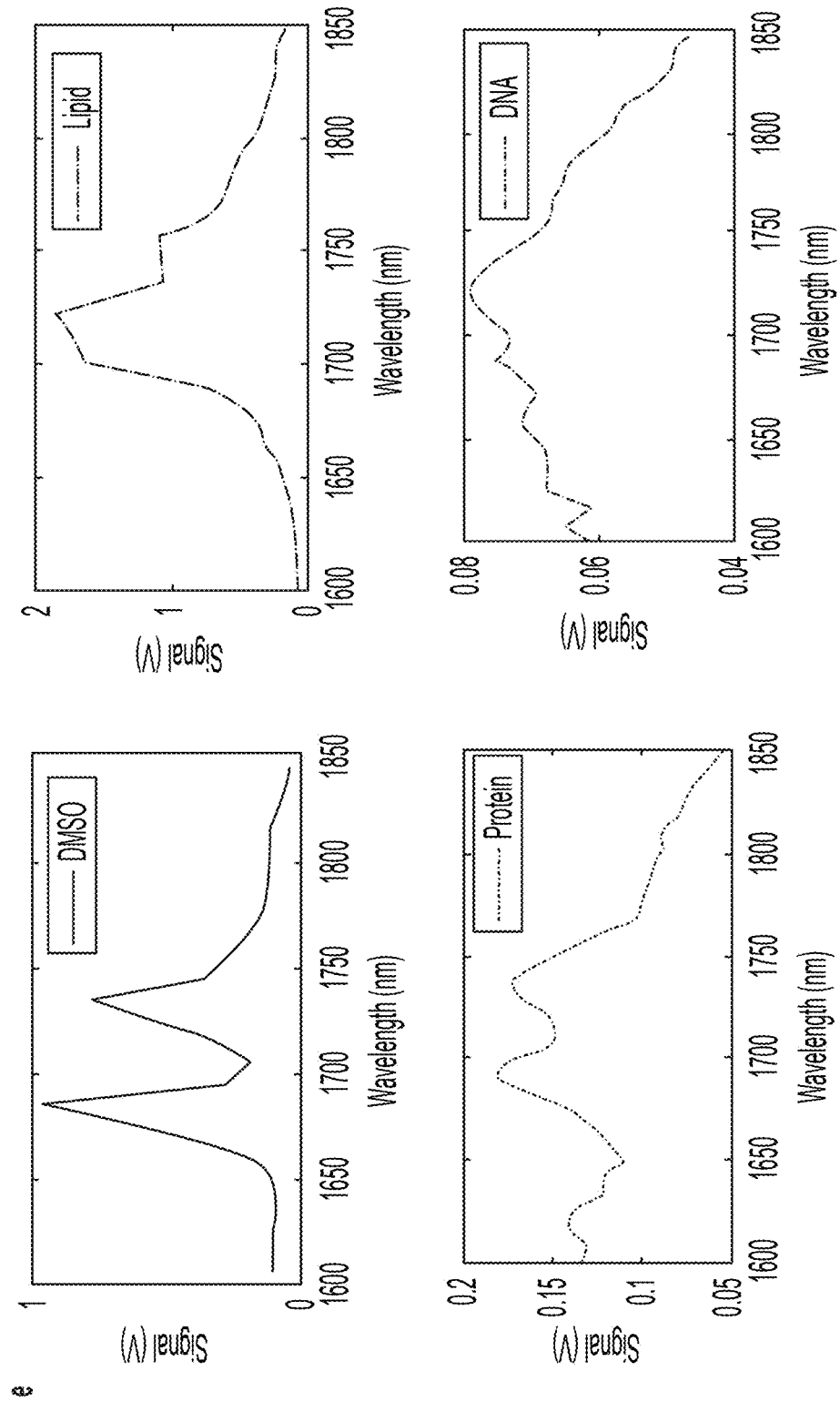
FIG. 3(e) illustrates SWIP spectra of DMSO, lipid, protein, and DNA.
Figure 3H:
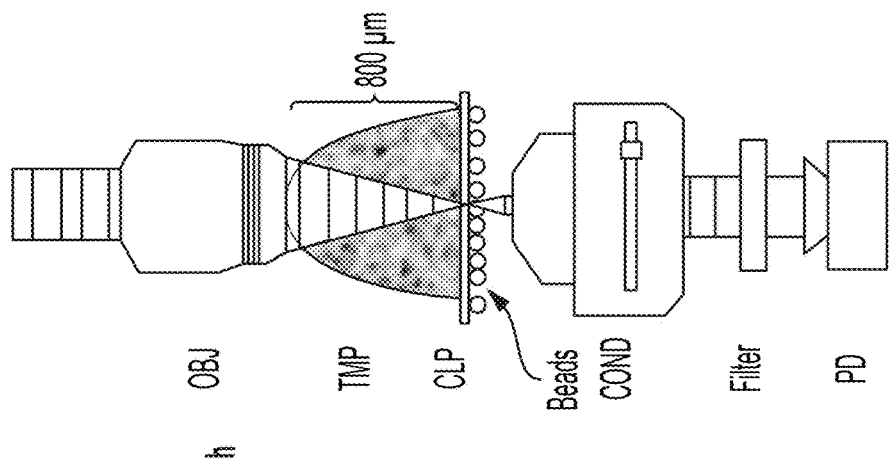
FIG. 3(h) illustrates scattering phantom imaging schematic. OBJ: objective lens. TMP: tissue-mimicking phantom. CLP: Coverslip. COND: condenser. PD: photodiode.
Figure 3G:
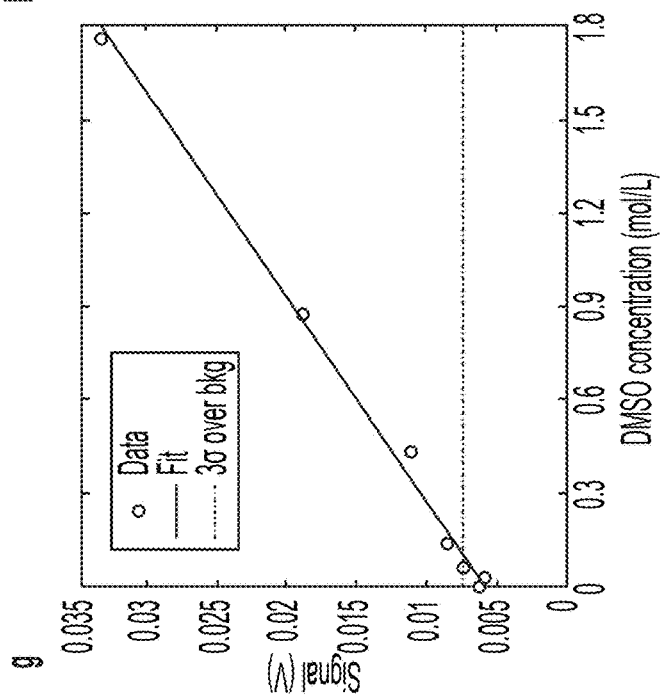
FIG. 3(g) illustrates SWIP signal dependence on the concentration of DMSO in $D_2O$.
Figure 3F:
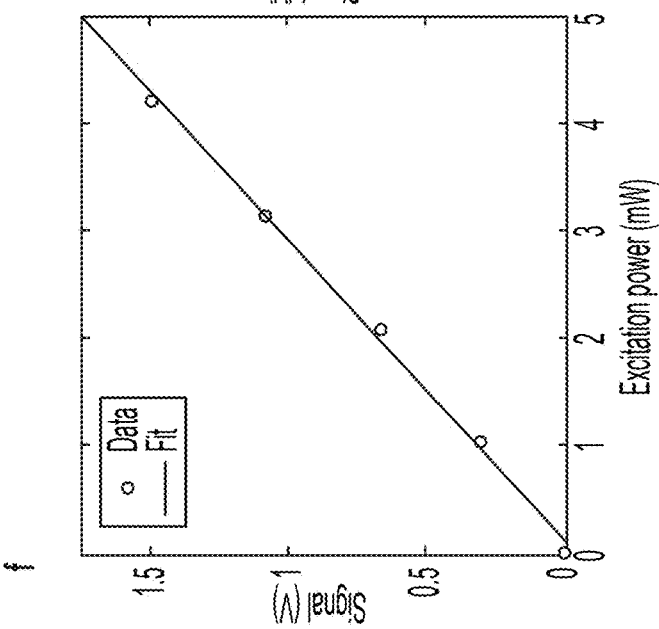
FIG. 3(f) illustrates SWIP signal dependence on excitation power. Sample: pure DMSO.
Figure 3K:
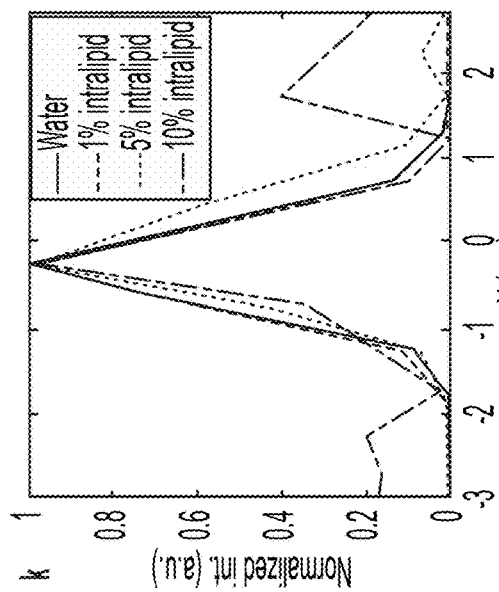
FIG. 3(k) illustrates a lateral profile of a single 1.0 m PS bead in FIG. 3(i) as indicated by the dashed lines.
Figure 3L:
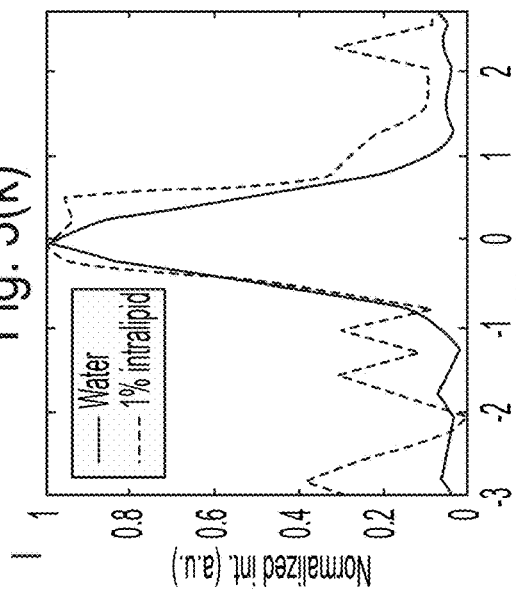
FIGS. 3(a) and 3(b) illustrate XY and YZ section of volumetric SWIP image of single 500 nm PS beads. Excitation power on sample: 20 mW. Scale bar: 1 km.
FIG. 3(c) and 3(d) illustrate single 500 nm PS bead's lateral and axial profile corresponding to dashed lines in FIGS. 3(a) and 3(b).
FIG. 3(i) illustrates SWIP imaging results of 1.0 m PS beads through water or scattering medium. Laser power on sample: 1725 nm: 20 mW. 1310 nm: 10.3 mW. Scale bar: 10 m.
FIG. 3(j) illustrates SRS imaging results of 1.0 m PS beads through water or scattering medium. Laser power on sample: 798 nm: 10 mW. 1040 nm: 60 mW (water group). 798 nm: 50 mW. 1040 nm: 100 mW (intralipid groups). Scale bar: 10 m.
FIG. 3(1) illustrates a lateral profile of a single 1.0 m PS bead in FIG. 3(j) as indicated by the dashed lines.
Figure 3I:
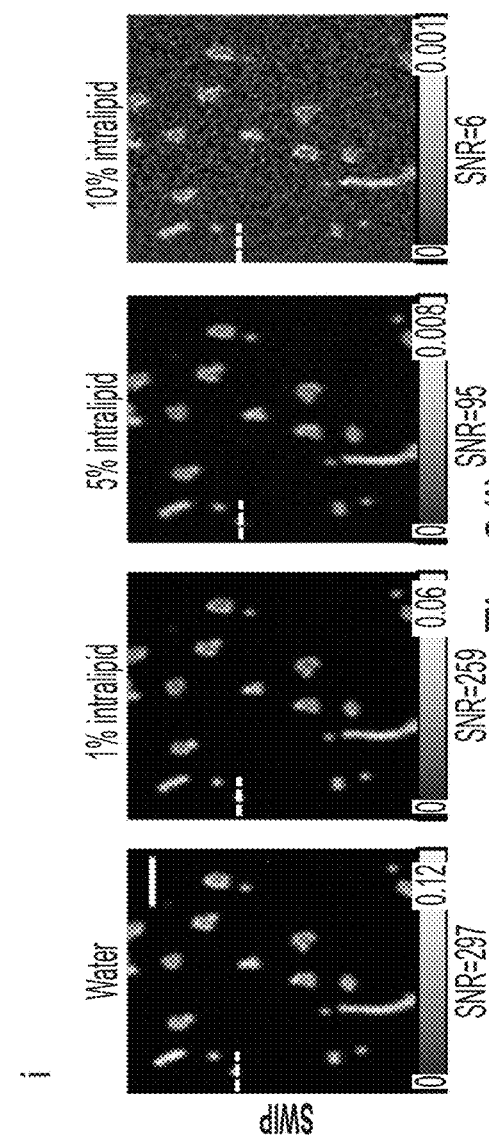
Figure 3J:
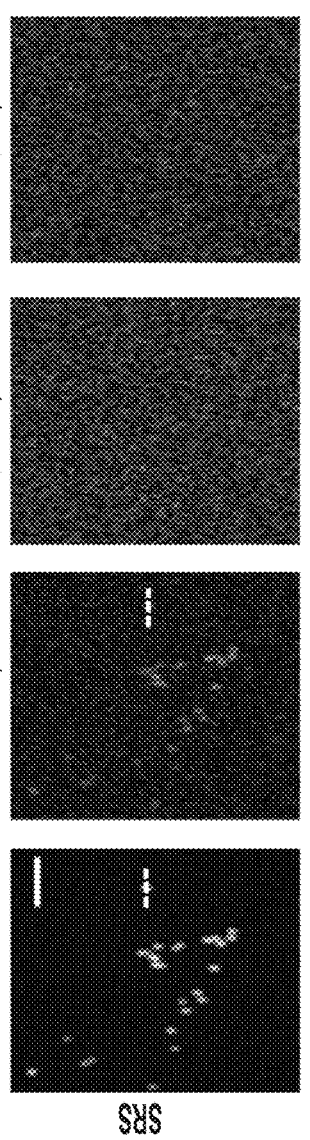

FIGS. 3(a) and 3(b) illustrate XY and YZ section of volumetric SWIP image of single 500 nm PS beads. Excitation power on sample: 20 mW. Scale bar: 1 m. FIGS. 3(c) and 3(d) illustrate single 500 nm PS bead's lateral and axial profile corresponding to dashed lines in FIGS. 3(a) and 3(b). FIG. 3(e) illustrates SWIP spectra of DMSO, lipid, protein, and DNA. FIG. 3(f) illustrates SWIP signal dependence on excitation power. Sample: pure DMSO. FIG. 3(g) illustrates SWIP signal dependence on the concentration of DMSO in $D_2O$. FIG. 3(h) illustrates scattering phantom imaging schematic. OBJ: objective lens. TMP: tissue-mimicking phantom. CLP: Coverslip. COND: condenser. PD: photodiode. FIG. 3(i) illustrates SWIP imaging results of 1.0 m PS beads through water or scattering medium. Laser power on sample: 1725 nm: 20 mW. 1310 nm: 10.3 mW. Scale bar: 10 m. FIG. 3(j) illustrates SRS imaging results of 1.0 m PS beads through water or scattering medium. Laser power on sample: 798 nm: 10 mW. 1040 nm: 60 mW (water group). 798 nm: 50 mW. 1040 nm: 100 mW (intralipid groups). Scale bar: 10 m. FIG. 3(k) illustrates a lateral profile of a single 1.0 m PS bead in FIG. 3(i) as indicated by the dashed lines. FIG. 3(1) illustrates a lateral profile of a single 1.0 m PS bead in FIG. 3(j) as indicated by the dashed lines.

The performance of the SWIP microscope of the current disclosure was characterized using standard samples. FIGS. 3(a) and 3(b) show the XY and YZ sections of volumetric SWIP images of 500 nm PS beads. The signal-to-noise ratio (SNR) of the XY image of a single bead was 25, suggesting the high sensitivity of SWIP. FIGS. 3(c) and 3(d) show the lateral and axial profiles of a single 500 nm PS bead, where the lateral and axial FWHM were 0.92 µm and 3.5 µm. After deconvolution with the bead's profile, the calculated system's lateral and axial resolution were 0.77 µm and 3.5 µm. Such a resolution is sufficient to resolve the subcellular features.

To confirm the chemical selectivity of the SWIP microscope of the current disclosure, SWIP spectra of standard samples were acquired (FIG. 3(e)). The SWIP spectra match well with the SWIR absorption spectra reported in the literature. The peak registration is illustrated in the Additional Descriptive Material, section 5, set forth below. FIGS. 3(f) and 3(g) show a linear dependence of the SWIP signal on both excitation power and molecular concentration, consistent with the ball-lens model of SWIP contrast (Additional Descriptive Material, section 1). Based on the concentration curve (FIG. 3(g)), the LOD of DMSO for SWIP was measured to be 112 mM. Under the same average power, the LOD of DMSO using a hyperspectral stimulated Raman scattering (SRS) microscope in the lab was 152 mM (FIGS. 12(a)-12(d)). Collectively, these data demonstrate good sensitivity and linearity of SWIP microscopy.

The deep-penetration, high-resolution imaging capability of the SWIP microscope of the current disclosure was characterized with scattering phantoms. A tissue-mimicking intralipid aqueous solution was placed between the objective and 1.0 m PS beads (FIG. 3(h)). Note that 1% intralipid has a similar scattering coefficient to human skin epidermis. FIG. 3(i) shows the SWIP imaging results through water, and 1%, 5%, 10% intralipid. The SWIP microscope of the current disclosure successfully resolved single 1.0 m PS beads even under 10% intralipids. In comparison, near-infrared SRS imaging was performed under the same conditions (FIG. 3(j)). In pure water condition, SRS showed higher resolution than the SWIP microscope of the current disclosure due to shorter excitation wavelengths. However, the image quality of SRS quickly degraded as the intralipid concentration increased. No beads could be seen by SRS under 5% and 10% intralipid solutions. To investigate the resolution degradation of the SWIP microscope of the current disclosure and SRS through scattering medium, the lateral profiles of a single bead were plotted. No significant broadening through scattering phantom for the SWIP microscope of the current disclosure were observed (FIG. 3(k)) but a slight broadening for SRS (FIG. 3(1)) was observed, indicating the SWIP microscope of the current disclosure can maintain good spatial resolution through highly-scattering medium, which is beyond reach of the typical near-infrared SRS microscope.

SWIP Imaging of Lipids in an Intact Tumor Spheroid

A tumor-derived spheroid is an in-vitro cancer model that better recapitulates tumor physiology than two-dimensional cell culture. As cancer development is closely related to the altered lipid metabolism, imaging intracellular lipids help understand cancer progression and test drug effectiveness. However, imaging cellular components inside spheroids is challenging as the densely packed cells strongly scatter light. Sectioning and tissue clearing have been applied to circumvent the strong scattering. Yet, these methods alter the metabolic state of spheroids and cannot be used for live sample study. Deep-penetrating multi-photon or light-sheet fluorescence microscopy can image live spheroids. However, fluorescent labeling is perturbative, especially for small lipid molecules.

FIG. 4(a) illustrates a raw SWIP image of monolayer OVCAR-5-cisR cells. Red arrow (left): lipid droplets. Blue arrow (right): water area. FIG. 4(b) illustrates a single-pixel SWIP signal trace at the red (left) arrow-pointed lipid area. The fitting result is $f(t)=0.071e^{-0.12t}+0.031e^{-1.96t}$. FIG. 4(c) illustrates a single-pixel SWIP signal trace at the blue (right) arrow-pointed background area. The fitting result $f(t)=0.024e^{-0.045t}+0.020e^{-0.50t}$. FIG. 4(d) illustrates a background rejection result of FIG. 4(a) using the decay characteristic. Red (left) arrow: lipid droplets. Blue (right) arrow: water area. FIG. 4(e) illustrates SWIP imaging of an OVCAR-5-cisR spheroid. FIG. 4(f) illustrates 3-D rendering of volumetric SWIP imaging of the OVCAR-5-cisR spheroid after background rejection. Laser power on sample for all subpanels: 1725 nm: 20 mW, 1310 nm: 8.5 mW. Scale bars for all subpanels: 20 m.

The SWIP microscopy system and method of the current disclosure overcomes the above-mentioned challenges. The SWIP contrast on single-layer cells was validated. The SWIP technology of the current disclosure mapped intracellular lipids well and revealed good cell morphology (FIG. 4(a)). Utilizing the different thermal decay coefficients of lipids (FIG. 4(b)) and bulk water (FIG. 4(c)), the water background in FIG. 4(a) was removed (blue (right) arrow, FIG. 4(d)) and the intracellular lipid contrast was enhanced (red (left) arrow, FIG. 4(d)). The logic and workflow of the background suppression are described in detail hereinbelow.

FIG. 4(e) shows SWIP images of an intact tumor spheroid with a diameter of around 200 μm. In raw SWIP images, the intracellular lipids were successfully identified at the top, equatorial, and bottom planes. After background suppression, the intracellular lipids showed up cleanly. Individual cells can be identified by circles of intracellular lipids (blue (right) arrow in FIG. 4(e)). Hollow structures in the center of the spheroid can be observed (white (left) arrow in FIG. 4(e)). FIG. 4(f) shows a background-removed three-dimensional volumetric SWIP image of the spheroid where an enriched accumulation and a relatively uniform distribution of lipid were seen.

SWIP Imaging of Lipids in Biological Tissues

Lipids play an important role in biological tissue including energy storage, signaling, and transport of fat-soluble nutrients. Imaging lipid content and its distribution inside a tissue enables a broad range of applications. Because fluorescent labeling is perturbative for lipid molecules, vibrational imaging is widely adopted for lipid studies. As described above, current vibrational imaging modalities do not allow high-resolution lipid imaging in deep tissue. Tissue sectioning is generally applied for high-resolution layer-by-layer imaging, but the sectioning process usually introduces morphological artifacts and causes lipid loss.

FIG. 5(a) illustrates SWIP imaging of a fresh swine liver slice. FIG. 5(b) illustrates SWIP imaging of a mouse ear. FIG. 5(c) illustrates SWIP imaging of a mouse brain slice. FIG. 5(d) illustrates SWIP imaging of a breast biopsy from a healthy human. FIG. 5(e) illustrates SWIP imaging of a mouse ear at 60 μm and 120 μm depth. FIG. 5(f) illustrates epi-SWIP imaging of a mouse brain at 300 μm and 500 μm depth. Laser power on sample: FIGS. 5(a)-5(d): 1725 nm: 20 mW, 1310 nm: 50 mW. FIGS. 5(e)-5(f): 1725 nm: 20 mW, 1310 nm: 70 mW. Scale bars for all subpanels: 20 m.

Figure 16:
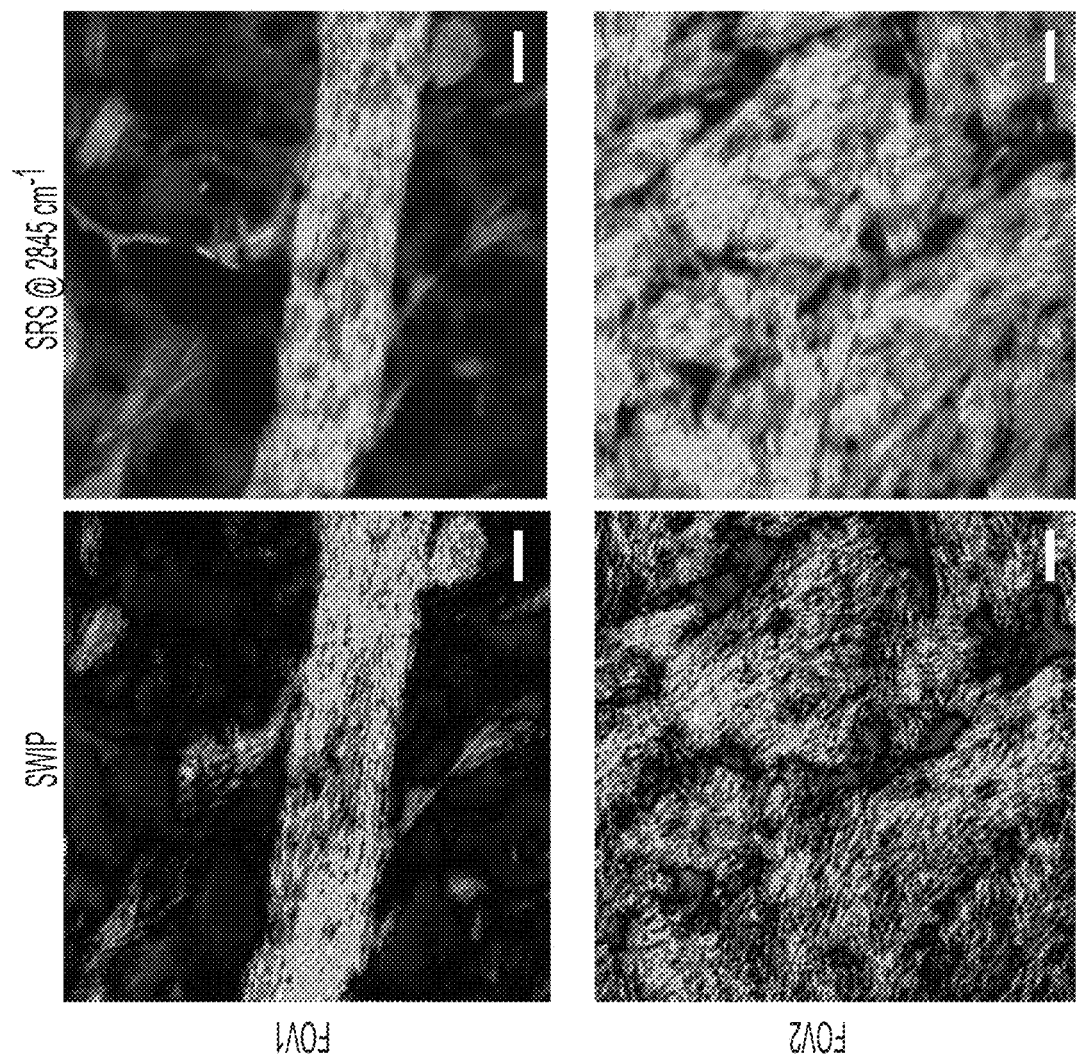
FIG. 16 illustrates SWIP and SRS benchmarking on a mouse brain slice.

SWIP imaging of lipids in various types of tissues were explored. FIG. 5(a) shows SWIP images of a fresh swine liver slice. The lipid and liver morphology revealed by SWIP was consistent with previously reported SRS results. Lipid droplets as small as 1.0 m in diameter can be distinguished even at 300 μm deep inside the fresh liver with rich blood content, which cannot be achieved via existing modalities. FIG. 5(b) shows SWIP images of a mouse ear. Characteristic layered structures were observed, including hair at Z=0 μm, sebaceous gland at Z=52 μm, and subcutaneous fat layer or cartilage at Z=156 μm. SWIP can also image through a 1.0 mm thick brain slice and well capture the myelin fibrous structures (FIG. 5(c)), confirmed by benchmarking with SRS on the same mouse brain slice (FIG. 16). Images in FIG. 5(b) and FIG. 5(c) have a slightly lower resolution because of using a different objective with longer working distance and lower effective NA (see additional detailed description below and FIG. 17(a)-17(d)). FIG. 5(d) demonstrates SWIP images of fat cells at different layers across a 600 μm thick healthy breast biopsy.

Regarding in-vivo deep-tissue imaging, an epi-detected SWIP system (FIGS. 18(a)-18(b)) was demonstrated. An amplified photodiode with higher sensitivity was used to detect the weak back-scattered probe laser. FIG. 5(e) shows epi-detected SWIP images of a mouse ear with sebaceous gland at Z=60 m and subcutaneous fat layer or cartilage at Z=120 μm, well matched with the forward results (FIG. 5(b)). FIG. 5(f) reports epi-detected SWIP images of an intact mouse brain. The SWIP signal became stronger at Z=500 m compared to Z=300 m as the imaging plane moving from the cell-rich grey matter to the myelin-rich white matter. Together, these results show that in-vivo SWIP imaging could be potentially achieved.

Figure 6:
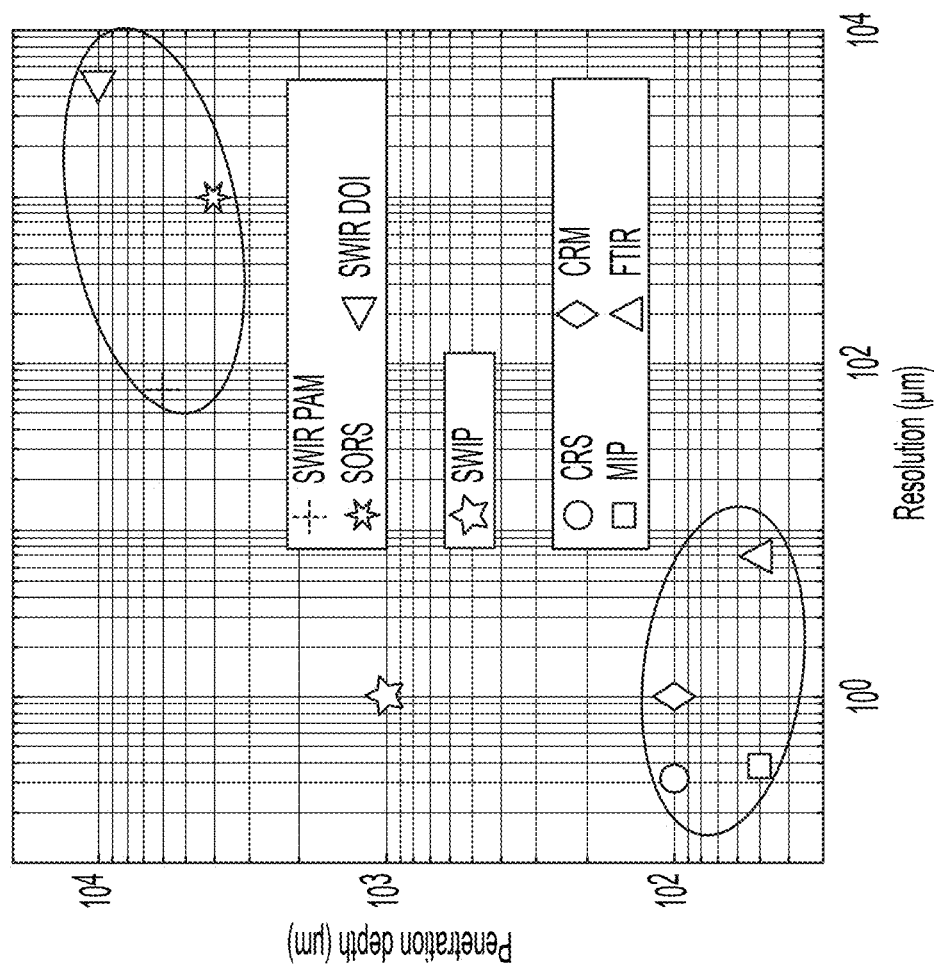
FIG. 6 includes a plot of penetration depth versus spatial resolution of vibrational imaging modalities.

FIG. 6 includes a plot of penetration depth versus spatial resolution of vibrational imaging modalities. Group 1 (Bottom-left): CRS: coherent Raman scattering, MIP: mid-infrared photothermal, CRM: confocal Raman microscopy, FTIR: Fourier transform infrared spectroscopy; Group 2 (Top-right): SWIR PAM: short-wave infrared photoacoustic microscopy, SWIR DOI: shortwave infrared diffusive optical imaging, SORS: spatial-offset Raman spectroscopy; Group 3: SWIP: shortwave infrared photothermal.

Referring to FIG. 6, a comparison of SWIP with existing vibrational imaging modalities in the depth-resolution space is illustrated. These techniques can be clustered into three groups. The first group (bottom-left) has subcellular resolution and sensitivity but limited imaging depth up to 100 microns. The second group (top-right) has deep penetration depth but relatively poor spatial resolution at best hundreds of microns. Although SWIR-PAM can achieve higher spatial resolution with tighter optical focus, the large signal loss leads to a low detection sensitivity (FIG. 11) and prevents it from probing small intracellular components. There exists a gap between two groups for deep tissue vibrational imaging at subcellular resolution. As demonstrated in this work, SWIP of the current disclosure successfully fills this gap. The millimeter-deep, micron-resolution, high-sensitivity vibrational imaging capability provided by SWIP opens opportunities for many applications including live organoid study, slice-free tissue pathology, dynamic embryo imaging, etc.

As a nonlinear optical microscopy, both SWIP and SRS signals are largely contributed by ballistic photons. To interpret the distinct imaging performance of SWIP and SRS shown in FIGS. 3(a)-3(1), the amounts of ballistic photons transmitted through a scattering medium were calculated. As shown in Table 1 below, through 800 µm of 10% intralipid, 1.9% and 0.11% photons at 1725 nm and 1310 nm remain ballistic, whereas the amounts of ballistic photons at 798 nm and 1040 nm are negligible. Thus, the deep imaging capability of SWIP largely benefits from the longer wavelengths.

It is noteworthy that the SWIP signal intensity is sensitive to the focusing condition. As in FIGS. 2(a)-3(1), the best configuration for PT detection is when two foci have similar size and in good lateral overlapping. The PA signal can be selectively detected if the probe volume is larger than the excitation volume, consistent with a photoacoustic remote sensing study. Compared to PT, PA imaging has its own merits. The PA signal is closely related to the mechanical property which is valuable for many applications. Furthermore, the high-frequency PA can circumvent low-frequency noises. The data and theory relating the signal level with the focusing condition can serve as a guide for better utilizing the strengths of PT and PA.

The SWIP microscopy system and method described herein in detail can be implemented in various embodiments. The single-color SWIP imaging using the first overtone absorption at 1725 nm mainly targets the C—H bond that is enriched in lipid content. With a wavelength-tunable excitation laser, hyperspectral SWIP imaging and subsequent decomposition can differentiate multiple molecular species such as proteins, fatty acids, cholesterol, and carbohydrates. It was observed that the SWIP LOD of 112 mM DMSO is relatively large compared to the molecule concentration inside a cell. Fortunately, many biomolecules such as lipids are locally concentrated, which ensures their detectability with SWIP. Furthermore, some biomolecules have multiple targeted bonds. As shown in Table 2 below, the C—H bond concentrations of cellular protein and lipid are much higher than the SWIP LOD for C—H bond. Thus, SWIP can be applied to study a variety of locally enriched biomolecules including lipid, cellular protein, and collagen.

Second, the acquisition time of the current SWIP microscopy system and method described in detail herein is around three minutes per frame, limited by the 2 kHz excitation laser repetition rate. Combining a higher-repetition-rate excitation laser with galvo scanning, the imaging speed of SWIP can be improved (see additional detailed description in the Additional Descriptive Material, section 6, set forth below). Third, SWIP has shown good performance in imaging through a homogeneous scattering phantom but encounters image degradation at hundreds-of-micrometers deep in the tissue. Such degradation is attributed to tissue-induced aberration which inevitably distorts the laser focus. By implementing adaptive optics for aberration correction, the SWIP microscopy system and method of the current disclosure can reach even deeper. Lastly, it is believed that SWIP microscopy can be applied to SWIP-Optical Coherence Tomography (SWIP-OCT) for high-speed volumetric vibrational imaging of organoids and tissues.

Chemicals

The oil and dimethyl sulfoxide (DMSO) solution samples reference herein were prepared by sandwiching 2 µl liquid with two no.1 coverslips. An 80 µm double-sided tape was placed between the two coverslips as a spacer. To prepare the polystyrene (PS) beads sample, an aqueous PS beads solution was first prepared and mixed well with an ultrasound homogenizer to avoid large aggregates. Then the beads solution was dried on a no.1 coverslip. When performing SWIP imaging, the coverslip side was on the top to isolate the beads from the immersion medium or the scattering phantom. The protein and DNA samples for the SWIP spectrum acquisition were prepared by sandwich bovine serum albumin crystal (A2153, Sigma-Aldrich) and DNA powder (D3159, Sigma-Aldrich) between two no.1 coverslips with 80 µm double sided tape as spacer.

Cancer Cells and Spheroids

Cisplatin-resistant ovarian cancer cells (OVCAR-5-cisR) were cultured in RPMI 1640 with 10% fetal bovine serum, 100 units/ml penicillin and 100 µg/ml streptomycin. Cells were seeded on a coverslip for 24 hours for monolayer cell imaging. To form ovarian cancer spheroids, 200 µl/well of OVCAR-5-cisR cell suspension were added to an ultra-low attachment 96 well plate with a cell density of $0.5 \times 10^4$ cells/ml. The spheroids were cultured for 7 days. Cells were then kept in 1× Phosphate Buffered Saline (PBS) and sealed in between two coverslips with spacers.

Biological Tissues

The fresh swine liver was purchased from a supermarket. Before imaging, the liver was hand-sliced into around 3 mm and sandwiched between two no.1 coverslips. The mouse ear sample was isolated from a 6-month-old mouse and fixed with 10% formalin solution. Before imaging, the ear was rinsed with 1× PBS and then attached to a coverslip. The mouse brain was from a 6-month-old mouse and fixed with 10% formalin solution. The brain was sliced to be 1-mm thick with a vibratome. Before imaging, the brain was rinsed with 1× PBS then attached to a coverslip. The de-identified healthy human breast biopsy sample was obtained from Susan G. Komen tissue Bank at the IU Simon Cancer Center. The breast biopsy sample was freshly frozen and had a thickness of around ~0.6 mm. Before imaging, the breast biopsy sample was defrosted then sandwiched between two coverslips.

SWIP Microscopy System

Referring again to FIGS. 1(a)-1(d), both pump (excitation) and probe beams are in the shortwave infrared window to ensure deep tissue penetration. In some exemplary embodiments, the pulsed pump (excitation) beam is generated by excitation light source 120, which can be, for example, an optical parametric oscillator (DX-1725-OPO, Photonics Industries), with a repetition rate of 2 kHz, wavelength in a range of 1000 nm to 2500 nm, for example, centered at 1725 nm or 1730 nm, and a pulse duration of 10 ns. The 1310 nm probe beam, wavelength in a range of 400 nm to 1500 nm, for example, centered at 1310 nm, can be generated by probe light source 110, which can be, for example, a CW diode laser (TURN-KEY CCS-LN/1310LD-4-0-0/OC, Research Lab Source Corporation). The 1725 nm excitation laser is chosen to excite the first overtone of C—H stretching vibrations. Although the first C—H overtone absorption cross section is around two orders of magnitude smaller than the fundamental absorption, detecting at the first overtone region can circumvent the strong water absorption in the mid-infrared region where water absorption is more than three orders stronger than that in the SWIR region. Moreover, compared to the second overtone, the first overtone of C—H gives seven times larger signal from lipids.

The beam sizes of the two lasers 110, 120 were adjusted to be around 6 mm with telescopes. The telescopes are also used for optimizing the axial offset of the two laser foci on sample to obtain maximum SWIP signal. After beam expansion, the two lasers were collinearly combined with dichroic mirror 140 and then focused into sample 160 through objective lens 150.

In some exemplary embodiments, two objective lenses can be used. For example, a 1.0 numerical aperture (NA) water-immersion objective with 800 µm working distance (UPLSAPO30XSIR, Olympus) can be used to image the polymer beads, cancer cells, spheroid, swine liver, and human breast biopsy. A 2-mm working distance objective with an effective NA of ~0.4 can be applied for mouse ear and brain imaging. The transmitted light from sample 160 can be collected by air condenser 180 (D-CUO, Nikon) with an adjustable aperture. After the condenser, the remaining excitation laser is filtered out by a 1310 nm bandpass filter 200 (FBH1310-12, Thorlabs). The signal-carrying probe beam is detected by detector 210, which in some exemplary embodiments can be a biased InGaAs photodiode (PD). When recording both PA and PT signals, we used a small-area high-speed PD (70 MHz bandwidth, 0.8 mm$^2$, DET10N2, Thorlabs) can be used as detector 210. When only targeting the PT signal, a slower PD with larger active area (11.7 MHz bandwidth, 3.14 mm$^2$, DET20C2, Thorlabs) can be used as detector 210. The photocurrent from the PD is converted to a voltage signal with a 50 Ohm impedance and then amplified by amplifier 220, which can be an AC-coupled low-noise voltage amplifier (100 MHz bandwidth, SA230F5, NF corporation) and digitized by digitizer 230, which can be a high-speed data acquisition card at 180 MSa/s (ATS9462, Alazar Tech). Every excitation laser pulse corresponds to a single pixel in the image. The image was formed by sample scanning achieved with stage 170, which can be a Nano-Bio 2200, Mad City Labs. The volumetric image can be acquired with a motorized z-knob to allow axial scanning.

SWIP Image Formation

Every pixel in the SWIP image corresponds to one excitation laser pulse, for which a temporal trace of the probe laser intensity is recorded. A gating method is applied to turn the signal temporal trace to pixel intensity. Two averaging windows are used: the first window is set before the excitation pulse arriving to estimate the probe intensity baseline; the second window starts at intensity extremum right after the excitation to obtain the changed probe intensity. The pixel intensity is assigned to be the difference between the two window averages. This gating method takes advantage of the long decay of PT signal for a better SNR. Multiple window sizes have been tested and the size of 80 sampling points (~450 ns) is chosen to output the best SNR.

SWIP Spectroscopy

The SWIP spectra were acquired by replacing the single-color excitation laser with a tunable excitation laser (Opolette HE 355 LD, OPOTEK Inc), which has a tuning range from 410 to 2400 nm, a pulse duration of 5 ns and a repetition rate of 20 Hz. Other parts in the SWIP microscopy system remained unchanged. The spectral scanning was achieved by manually tuning the laser wavelength with a step size of 10 nm.

Time Domain Extraction of SWIP Signal from Water Background

Figure 14:
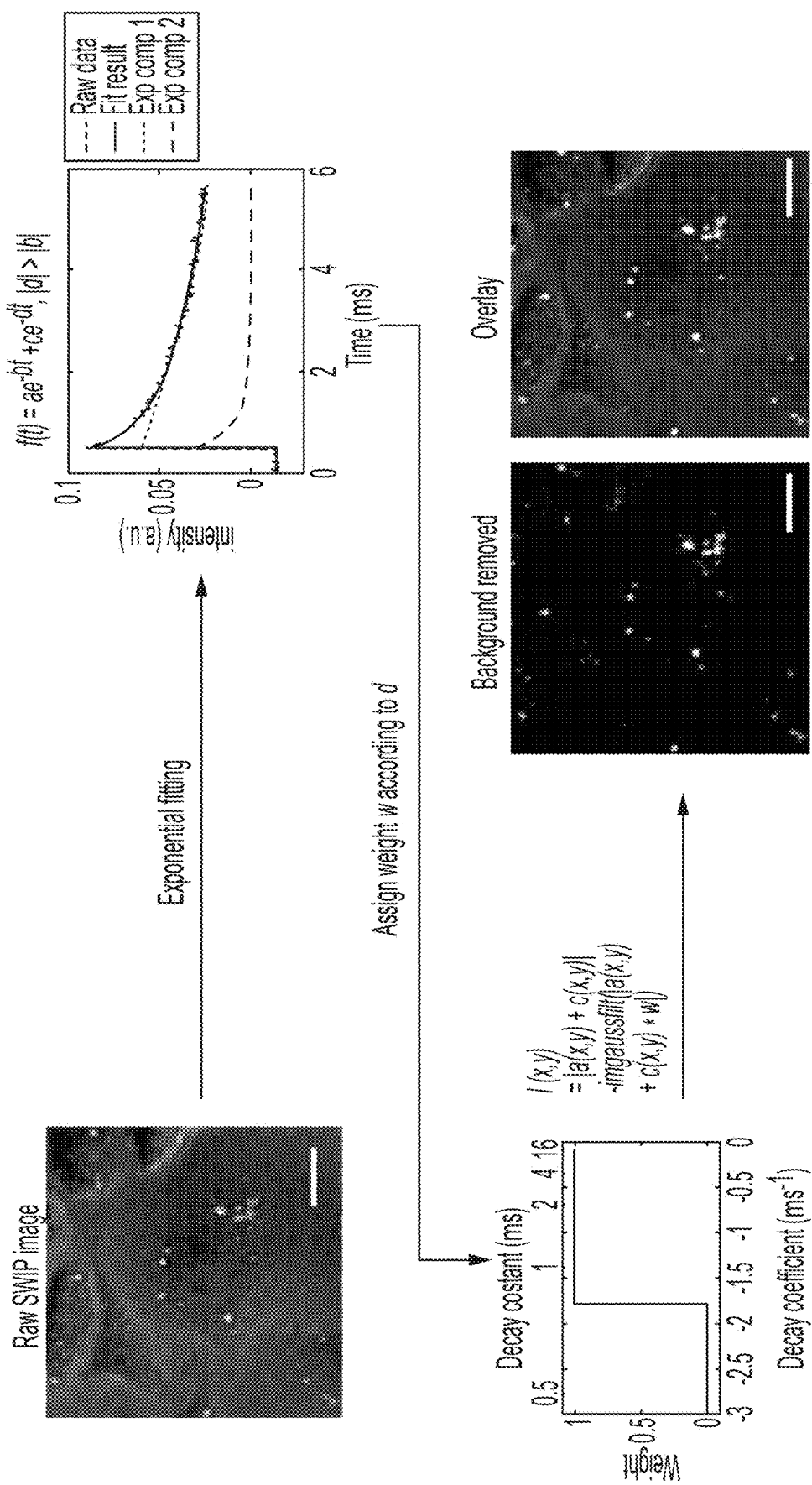
FIG. 14 illustrates a water background rejection workflow.

The thermal property is closely related to the object size, shape, and chemical constitution. The thermal decay coefficient of the SWIP signal can therefore provide extra information for differentiating small objects within a bulk medium. When the particle size is smaller than the SWIP heating volume (usually satisfied for intracellular features as the axial resolution of SWIP is 3.5 µm), the heat dissipation of the small object is significantly faster than that of the bulk surrounding medium. The single-pixel SWIP traces shown in FIGS. 4(b) and 4(c) support this. To reject the background from bulk medium with the thermal decay difference, the decay part of every SWIP signal trace is fitted with a two-component exponential function. The two-component exponential function is selected considering the detected SWIP signal consists of the in-focus target and out-of-focus water background contribution. A weight w(x,y) is calculated by thresholding the decay coefficient d(x,y) of the faster decay component. The water background is estimated by $\alpha(x,y)+c(x,y)*w(x,y)$, where $\alpha(x,y)$ and $c(x,y)$ are the amplitude of the two fitted exponential components. Assuming the water background is spatially slow-varying, a Gaussian blurring filter is applied on the estimated water background to avoid sharp spatial intensity change. The final image is generated by subtracting the water background from the raw image. The background rejection workflow is shown in FIG. 14.

Considering the fitting fidelity is related to the SNR, the robustness of the fitting-based background rejection algorithm was tested. As illustrated in FIG. 15, weak signals with a SNR around 8 can be extracted with high fidelity.

Limit of Detection Measurement

The limit of detection is the molar concentration with a signal intensity as 3 times of background standard deviation over the background. If the signal has a linear dependence on the concentration, the LOD can be calculated by: LOD=3a/S, where a is the standard deviation of the background intensity, S is the fitted slope of the signal versus concentration.

Stimulated Raman Scattering (SRS) Microscope

Two synchronized femtosecond laser pulse trains with an 80 MHz repetition rate were used for SRS imaging. The wavelengths of the lasers are at 800 nm and 1040 nm to target the C—H stretch vibration. The 1040 nm laser is modulated by an acousto-optic modulator (AOM) at 2.27 MHz to separate the SRS signal from the laser repetition rate frequency. The SRS is conveyed by the modulation transfer from 1040 nm to 800 nm laser at 2.27 MHz. The two lasers are chirped to a few picoseconds with SF57 glass rods for spectral focusing. A dichroic mirror spatially combines the two lasers. The combined beams pass a pair of galvo mirrors for laser scanning, then is focused on the sample by the same objective (1.0 NA, UPLSAPO30XSIR, Olympus) used for SWIP. The transmitted light is collected by a 1.4 NA oil-immersion condenser and filtered by a 980 nm short pass filter. The residue 800 nm laser is detected by a biased photodiode. The SRS signal is obtained by demodulating the signal received by a photodiode with a lock-in amplifier.

Additional Descriptive Material

1. A Ball-Lens Model for the Optically Detected Photothermal Signal

To interpret the shortwave infrared photothermal (SWIP) contrast, a ball-lens model that connects the SWIP intensity with the thermal-induced refractive index change was developed. (FIGS. 7(a) and 7(b)). The model is based on a geometrical approximation, which ignores interference and diffraction for ease of understanding.

FIG. 7(a) includes a schematic diagram of detection where the thermal lens is larger or matches the size of the probe focus. FIG. 7(b) includes a schematic diagram of detection where the thermal lens is smaller than the size of the probe focus. The dashed lines 102a, 102b and solid lines 104a, 104b represent the propagation of the probe beam in the absence and presence of the thermally induced ball lens, respectively.

Regarding the case where the thermal-induced lens is larger than or matches the size of the probe beam (FIG. 7a), the generated thermal lens can be simplified as a ball lens with a uniform refractive index change δn and a radius r. n is the original refractive index of the sample, p and q are the distances from the thermal lens to the unmodulated probe focus and the modulated probe focus, respectively. $\theta_1$, $\theta_2$ are the divergence angles of the unmodulated and modulated probe laser. $\alpha$ is the radius of the detection aperture. $\alpha_1$, $\alpha_2$ are the radius of the unmodulated and modulated probe beam at the plane of detection aperture. According to the ball lens formula, $$\frac{1}{f} = \left(\frac{n-\delta n}{n} - 1\right)\frac{2}{r} = \frac{2\delta n}{nr} \quad (2)$$

Assuming that the probe laser is a Gaussian beam. According to the Gaussian beam thin-lens equation:

$$\frac{\theta_1}{\theta_2} = m = \frac{f}{\sqrt{(p-f)^2 + z_R^2}} \quad (3)$$

Here, $z_R$ is the Rayleigh range of the unmodulated probe laser. As $\delta n \ll n$, we have $|f| \gg r \sim z_R$. Therefore, $$\frac{\theta_1}{\theta_2} \approx \frac{f}{f-p} \quad (4)$$

A constant total intensity $I_{probe}$ is assumed before and after the thermal modulation. The intensity distribution on the detection aperture plan for the unmodulated and modulated probe beam are denoted as $I_1$ and $I_2$:

$$I_1(r) = I_{probe}\frac{2}{\pi a_1^2}\exp\left(\frac{-r^2}{a_1^2}\right) \quad (5)$$

$$I_2(r) = I_{probe}\frac{2}{\pi a_2^2}\exp\left(\frac{-r^2}{a_2^2}\right) \quad (6)$$

Assuming $\alpha \ll \alpha_1$, $\alpha_2$, the transmitted laser intensity after the detection aperture can be written as follows:

$$I_1^{det} = \int_0^\alpha I_1(r)*2\pi r\,dr = I_{probe}\left(1 - \exp\left(-\frac{a^2}{a_1^2}\right)\right) \approx I_{probe}\frac{a^2}{a_1^2} \quad (7)$$

$$I_2^{det} = \int_0^\alpha I_2(r)*2\pi r\,dr = I_{probe}\left(1 - \exp\left(-\frac{a^2}{a_2^2}\right)\right) \approx I_{probe}\frac{a^2}{a_2^2} \quad (8)$$

Here, $I_1^{det}$ and $I_2^{det}$ are the probe beam intensity on the detector without and with the thermal lens, respectively. The detected modulation depth induced by the thermal lens can then be calculated as:

$$\left(\frac{\Delta I}{I}\right)bl \approx pr = \frac{I_2^{det} - I_1^{det}}{I_1^{det}} = \frac{a_1^2}{a_2^2} - 1 \quad (9)$$

Here, bl and pr represent the ball lens size and the probe focus size, respectively. Under paraxial approximation, $\alpha_1 \approx \theta_1 Z$, $\alpha_2 \approx \theta_2 Z$. By utilizing $|f| \gg r \sim p$, Equation 8 can be re-written as:

$$\left(\frac{\Delta I}{I}\right)_{bl \approx pr} = \quad (10)$$

$$\frac{a_1^2}{a_2^2} - 1 = \frac{\theta_1^2}{\theta_2^2} - 1 = \left(\frac{f}{f-p}\right)^2 - 1 = \frac{-2fp - p^2}{(f-p)^2} \approx -2\frac{p}{f} = -4\frac{p}{nr}\delta n$$

In the present approach, $\delta n$ is negative, which gives a positive modulation depth. By denoting $\beta$ as the percentage of the probe laser transmitted from the sample to the detector through the aperture, the SWIP intensity can be written as follows:

$$I_{SWIP} = \left(\frac{\Delta I}{I}\right)_{e \approx b}\beta I_{probe} = -4\frac{p}{nr}\beta I_{probe}\delta n \quad (11)$$

The thermal-induced refractive index change $\delta n$ arises from the temperature rise $\Delta T$ induced by optical absorption:

$$\delta n = \alpha\Delta T = \sigma N\tau I_{excitation} \cdot \alpha\frac{1}{C_p} \quad (12)$$

Here, a is the negative thermo-optic coefficient, $C_p$ is the heat capacity of the sample; $\sigma$ is the overtone absorption coefficient; N is the number of molecules in the focus volume, which represents the molecular concentration given a fixed focus volume; i is the duration of the excitation pulse. As the excitation pulse (~10 ns) is short in SWIP, we do not consider the heat dissipation here; $I_{excitation}$ is the average intensity of the excitation laser within the pulse duration.

Combining equations 10 and 11 obtains:

$$I_{SWIP} = \sigma N\tau I_{excitation} \cdot \alpha\frac{1}{C_p} \cdot \left(-4\frac{p}{nr}\beta I_{probe}\right) \quad (13)$$

Equation 13 contains three parts. The first term presents the amount of optical absorption which is linear to the excitation intensity, overtone cross-section, and molecular concentration. This linear relationship lays the foundation for quantitative chemical analysis. The second term presents the conversion from optical absorption into a refractive index change. The third term presents the conversion of refraction index change into a probe intensity modulation. This term indicates that the SWIP intensity not only depends on the transmitted probe intensity ($\beta I_{probe}$), but also on the radius (r) of the thermal lens and the offset (p) of the probe focus from the thermal lens.

Regarding the case where the thermal lens with radius r is smaller than the probe focus (FIG. 7(b)), i.e., the situation described in detail above in connection with FIG. 2(d), with an enlarged probe focus, only the central portion of the light is modulated by the thermal lens. This is equivalent to a reduced $I_{probe}$ for calculating $I_2^{det}$. Denoting the probe beam radius w at the plane of the thermal lens, the $I_2^{det}$ can be calculated as:

$$I_2^{det} = \left(I_{probe}\frac{r^2}{w^2}\right)\frac{a_1^2}{a_2^2} \tag{14}$$

The modulation depth for FIG. 7(b) can then be written as:

$$\left(\frac{\Delta I}{I}\right)_{bl<pr} = $$

$$\frac{I_2^{det} - I_1^{det}}{I_1^{det}} = \frac{r^2}{w^2}\frac{a_1^2}{a_2^2} - 1 = \frac{r^2}{w^2}\left(\left(\frac{\Delta I}{I}\right)_{bl\approx pr} + 1\right) - 1 \approx \frac{r^2}{w^2}\left(\frac{\Delta I}{I}\right)_{bl\approx pr} \tag{15}$$

Equation 15 shows a reduced modulation depth when the thermal lens is smaller than the probe focus. This reduction of modulated portion also explains the reduced PT modulation depth when the probe focus has a lateral offset from the thermal lens. This model is based on geometrical derivation and considers no diffraction. A more rigorous analysis can be derived based on scattering theories. Overall, the present theoretical model explains the experimental result shown and described in connection with FIGS. 2(a)-2(l).

2. Derivation of the Ratio Between Optically Detected PT and PA Amplitude

The amplitude of PT-induced refractive index change $\delta n_{PT}$ and PA-induced refractive index change $\delta n_{PA}$ can be written in terms of initial temperature rise $\Delta T$ and initial pressure rise $p_0$:

$$\delta n_{PT} = \alpha \Delta T \tag{16}$$

$$\delta n_{PA} = \frac{\eta n_0^3 p_0}{2\rho v_a^2} \tag{17}$$

Here, $\alpha$ is thermo-optic coefficient, $\eta$ is elasto-optic coefficient, $n_0$ is the initial refractive index of the sample, $\rho$ is density, $v_a$ is speed of sound. $p_0$ can be related to $\Delta T$ through:

$$p_0 = \Gamma \rho C_V \Delta T \left(\frac{\tau_{relax}}{\tau_{pulse}}\right) \tag{18}$$

$$\tau_{relax} = \frac{r_{focus}}{v_a} \tag{19}$$

where $\Gamma$ is Gruneisen parameter, $C_V$ is constant volume heat capacity, $\tau_{relax}$ is the acoustic relaxation time, $\tau_{pulse}$ is the pulse duration, $r_{focus}$ is the radius of probe focus. With 1725 nm excitation wavelength and 1.0 objective numerical aperture (NA), $r_{focus}$=526 nm and $\tau_{relax}$=0.35 ns. Because the acoustic relaxation time is shorter than the pulse duration ($\tau_{pulse}$=10 ns) but the thermal relaxation time is longer, the heat can accumulate during the excitation while the pressure keeps propagating out. This difference leads to a distinct contribution of PT and PA in the optically detected signal. According to the contrast model described in Additional Descriptive Material, section 1, the optically detected signal amplitude is proportional to the refractive index change. Therefore, by combining supporting equations (16) to (19), the theoretical ratio between PT and PA amplitudes are obtained as shown in equation (1).

For olive oil, $|\alpha|$=0.00043 K$^{-1}$, $v_a$=1490 m/s, $\eta \approx 0.3$, $n_0$=1.42, $\Gamma$=0.9, $C_V$=1970 J*K*kg$^{-1}$. Assuming $r_{focus}$=400 nm calculated with 1310 nm probe wavelength and 1.0 objective NA, we find that $$\frac{I_{PT}}{I_{PA}} \approx 47.$$

3. Description of the PA Oscillation Cycle Alteration

Figure 8B:
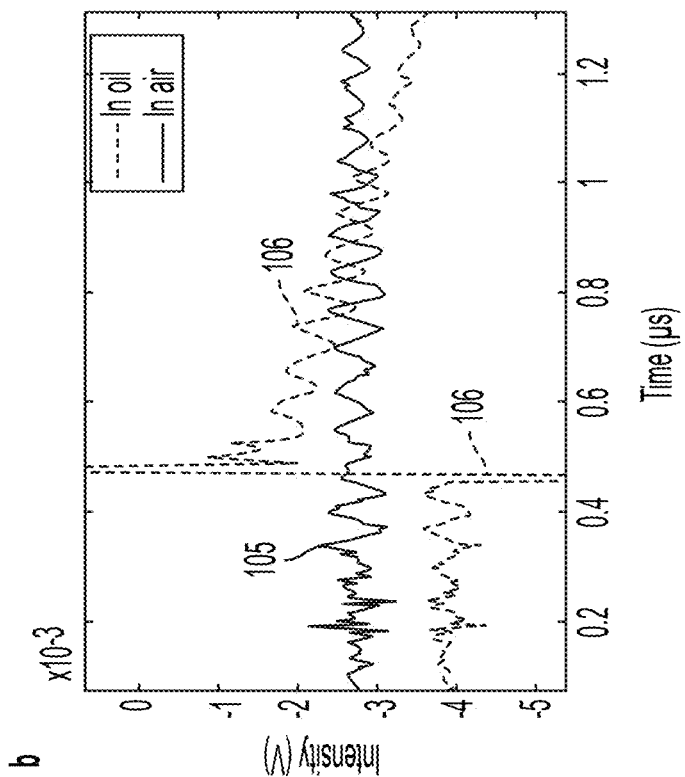
FIG. 8(b) illustrates a zoom-in view of the detail box of FIG. 8(a).
Figure 8A:
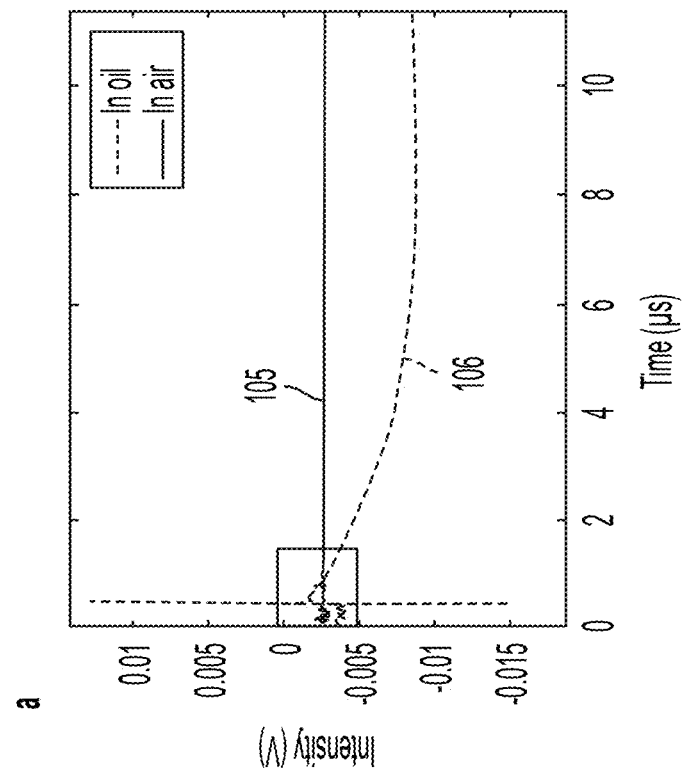
FIG. 8(a) includes a plot of the optically detected signal from oil and from air.

FIG. 8(a) includes a plot of the optically detected signal from oil 106 and from air 105. FIG. 8(b) illustrates a zoom-in view of the detail box of FIG. 8(a). An alteration in the oscillation cycle after the strongest PA pulse was observed in FIGS. 2(c), 2(i), and 2(l). The smallest oscillation cycle (around 67 ns) in FIG. 2(i) and FIG. 2(l) came from the detector noise. To confirm that, the signals were acquired with or without sample by moving the focus into the oil or into the air. Noting that air does not give any PT and PA signal in this case, a similar oscillation pattern was noted when the laser focus is in the air without targeting any sample, which proved the hypothesis (FIGS. 8(a)-8(b)). In FIG. 2(c) and FIG. 2(f), the oscillations (cycle around 260 ns) after the main PA pulse were from the low-frequency components of the PA signal. The low-frequency PA signal in FIG. 2(c) attenuated as the probe focus shifted out from the excitation focus (FIG. 2(i) and FIG. 2(l)) while the amplitude of the main PA pulse at high frequency remained almost unchanged. The different attenuation at different frequency was attributed to the nature of acoustic wave propagation, which is that the low-frequency acoustic wave has a poorer directionality than the high-frequency acoustic wave, therefore low-frequency acoustic has a greater attenuates along the travel distance.

4. Comparison Between Limited of Detection for SWIP and Optically Detected PA

FIG. 9(a) illustrates SWIP intensity dependence on the concentration of DMSO in D$_2$O. Signal is fitted with second order polynomial. Fitting result: y=0.010x$^2$−0.015x+0.013. Power on sample: 1725 nm: 5 mW, 1310 nm: 10 mW. FIG. 9(b) illustrates SWIP intensity dependence on the concentration of DMSO in D$_2$O at the low concentration region. Signal is fitted with first order polynomial. Fitting result: y=0.015x+0.0056. 3$\sigma$ over background is at y=0.0074. FIG. 9(c) illustrates optically detected PA intensity dependence on the concentration of DMSO in D$_2$O. Signal is fitted with second order polynomial. Fitting result: y=1.4e$^{-4}$x$^2$−6.5e$^{-4}$x+0.0081. 3$\sigma$ over background is at y=0.0070. Power on sample: 1725 nm: 5 mW, 1310 nm: 10 mW.

The SWIP and optically probed PA signal intensity were compared using dimethyl sulfoxide (DMSO) in D$_2$O at different concentrations as shown in FIGS. 9(a) to 9(c). At high DMSO concentrations, the SWIP and the optically probed PA intensity has a nonlinear dependence on the DMSO concentration. This is because D$_2$O has a distinct thermal property from DMSO. Diluting DMSO in D$_2$O alters the heat capacity of the solution and introduces nonlinearity in the signal dependence on concentration. At low DMSO concentrations, the variation of the heat capacity is negligible. According to the curve in FIGS. 9(b) and 9(c), the limit of detection (LOD, see Methods) for SWIP is measured to be 112 mM and the LOD for optically detected PA is around 7.78 M.

5. SWIP Spectra Peak Registration

In FIG. 3(e), the DMSO peaks at 1685 nm and 1735 nm are from the first overtone of asymmetric $CH_3$ stretching ($2v_a$ $CH_3$) and the first overtone of antisymmetric $CH_2$ stretching ($2v_{as}$ $CH_3$). The lipid peaks at 1723 nm and 1758 nm are from the first overtone of asymmetric $CH_2$ stretching ($2v_a$ $CH_2$) and the first overtone of symmetric $CH_2$ stretching ($2v_s$ $CH_2$). The protein peak at 1690 nm comes from the $CONH_2$ groups in the beta-sheet structure. The protein peak at 1738 nm is from the $CONH_2$ groups in the alpha-helix structure. The DNA peak at 1720 nm could come from the first overtone of $CH_2$ stretching.

6. Potential Imaging Speed Improvement by Using a High-Repetition Rate Laser

There is a trade-off between the SNR and acquisition speed. With the same average power on sample, repetition rate is inversely proportional to the energy of single excitation pulse. Therefore, the single-pulse SWIP signal intensity is inversely proportional to the excitation repetition rate. The current noise in SWIP is dominated by the electronic noise. The decreased SNR after improving the imaging speed can be ameliorated by applying larger amplification on the small signal. The following calculation illustrates this in detail.

Figure 10:
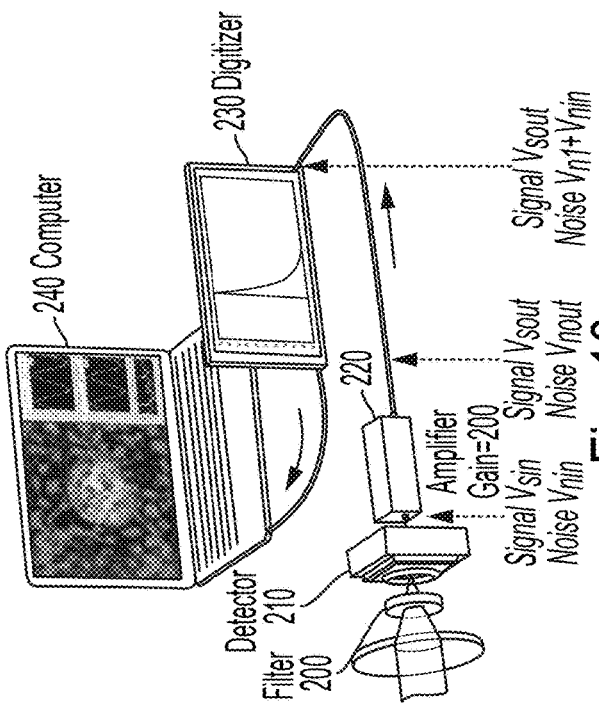
FIG. 10 is a detailed view of system 100 illustrated in FIG. 1(d).

FIG. 10 is a detailed view of system 100 illustrated in FIG. 1(d). Referring to FIG. 10, the current detection approach is illustrated. The signal and noise constitution are labeled. The input noise level of the digitization card is around $V_{n1}=2$ mV. The maximum output signal amplitude from the amplifier is $V_{max}=2$ V. The amplification factor of the amplifier is G=200. The input noise of the amplifier is around $V_{min}=0.25$ pV with 1 MHz detection band. Assuming the input signal level is $V_{sin1}=1$ mV before amplifier with 2 kHz excitation laser. After one amplifier, the output signal level is $V_{sout1}=200*1$ mV=0.2V and the output noise is $V_{nout1}=200*0.25$pV=0.05 mV. The SNR is calculated as $V_{sout1}/(V_{n1}+V_{nout1})=0.2V/2$ mV=100. With 100 kHz excitation laser and the same average power on sample, the signal level will be $V_{sin2}=0.02$ mV. Now two cascade amplifiers can be used to amplify the small signal. The output signal level $V_{sout2}=200*200*0.02$ mV=0.8V. The output noise level will be $V_{nout2}=200*200*0.25$pV=10 mV. The SNR is calculated as $V_{sout2}/(V_{nout2}+V_{n1})=0.8$V/12 mV=67.

In conclusion, although the signal dropped by 50 times by switching the laser from 2 kHz laser to 100 kHz, the SNR only drops 1.5 times with cascade amplification. An imaging frame rate of 2.5 Hz with 200*200 pixel (every pixel corresponds to one excitation pulse) is expected with 100 kHz excitation. It should be noted that with repetition rate above 100 kHz, the sample may not completely cool down before next excitation pulse arrives, which will lead heat accumulation and possibly sample damage.

Figures 11A, 11B, 11C:
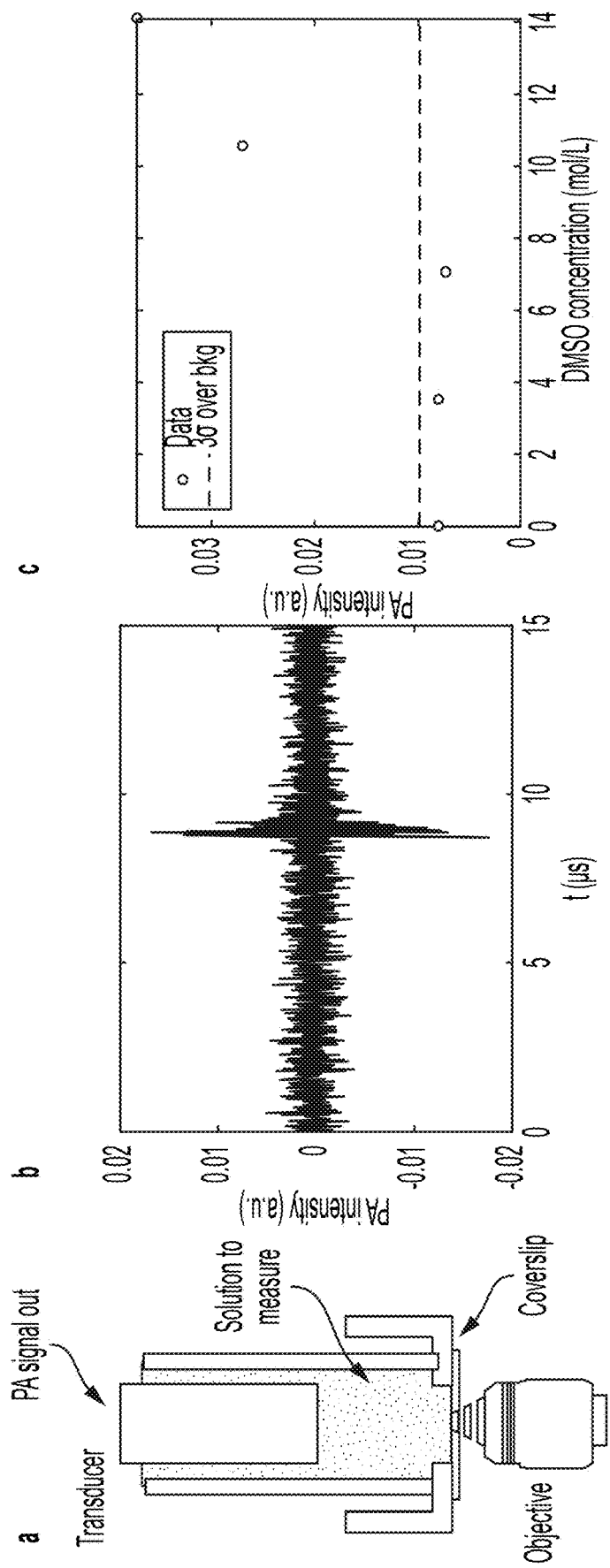
FIGS. 11(a)-11(c) illustrate shortwave infrared photoacoustic microscopy (SWIR PAM) signal intensity dependence on the concentration of DMSO in $D_2O$. Specifically, FIG. 11(a) includes a SWIR PAM schematic functional diagram. Objective: 1.0 NA water-immersion objective. Transducer: 25 MHz central frequency, V324-SM Olympus.

FIGS. 11(a)-11(c) illustrate shortwave infrared photoacoustic microscopy (SWIR PAM) signal intensity dependence on the concentration of DMSO in $D_2O$. Specifically, FIG. 11(a) includes a SWIR PAM schematic functional diagram. Objective: 1.0 NA water-immersion objective. Transducer: 25 MHz central frequency, V324-SM Olympus. FIG. 11(b) illustrates a single SWIR PAM trace. FIG. 11(c) illustrates SWIR PAM signal intensity dependence on the concentration of DMSO in $D_2O$. 3σ over background is at y=0.0098. Power on sample: 1725 nm: 5 mW.

Figure 12A:
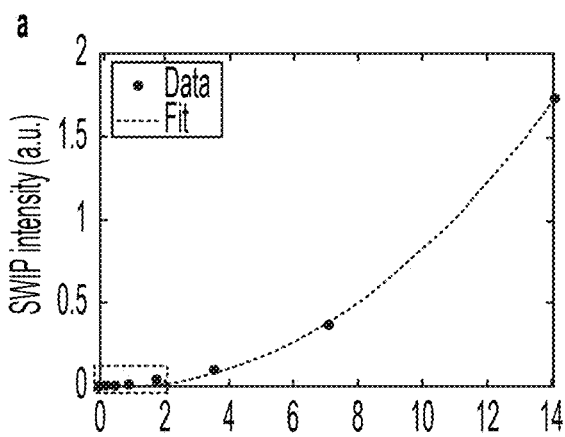
FIGS. 12(a)-12(d) illustrate a sensitivity comparison between SWIP and SRS. Specifically.
Figure 12B:
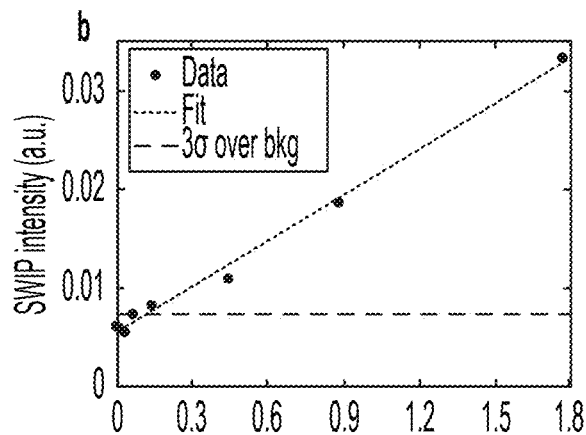
Figure 12C:
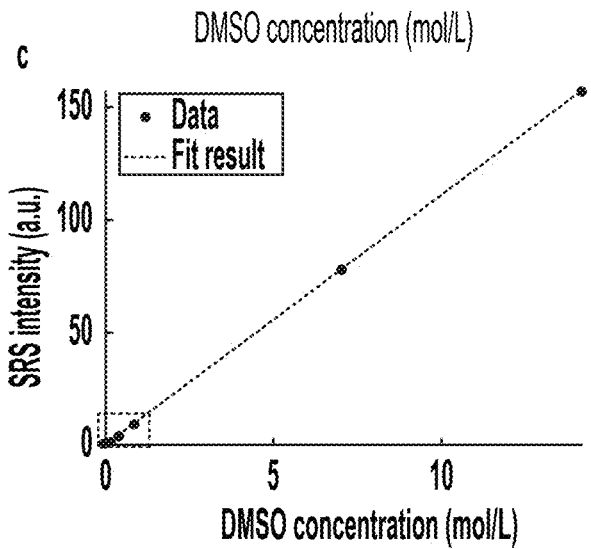
Figure 12D:
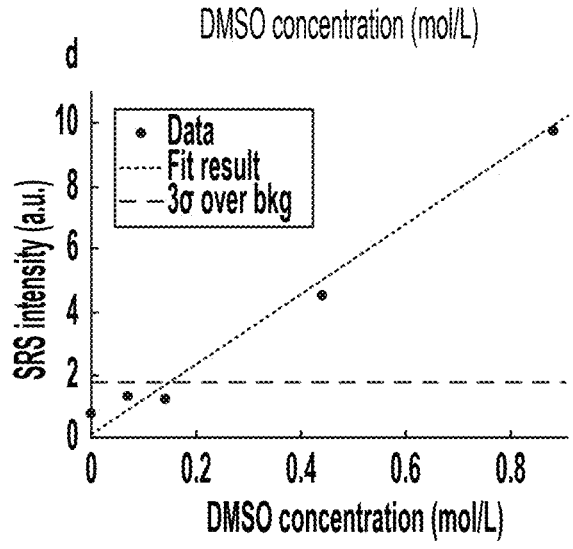

FIGS. 12(a)-12(d) illustrate a sensitivity comparison between SWIP and SRS. Specifically, FIG. 12(a) illustrates SWIP intensity dependence on the concentration of DMSO in $D_2O$. Signal is fitted with second order polynomial. Fitting result: y=0.010×2-0.015x +0.013. Power on sample: 1725 nm: 5 mW, 1310 nm: 10 mW. FIG. 12(b) illustrates SWIP intensity dependence on the concentration of DMSO in $D_2O$ at the low concentration region (detail box in (a)). Signal is fitted with first order polynomial. Fitting result: y=0.015x+0.0056. 3σ over background is at y=0.0074. FIG. 12(c) illustrates SRS intensity dependence on the concentration of DMSO in $D_2O$. Signal is fitted with first order polynomial. Fitting result: y=11.1x+0.0962. 3σ over background is at y=1.79. Power on sample: 1040 nm: 5 mW, 800 nm: 10 mW. Dwell time: 500 μs. Objective used for SRS: 1.2 NA, UPLSAPO60XW, Olympus. FIG. 12(d) illustrates a zoom-in view of the detail box in FIG. 12(c).

Figure 13:
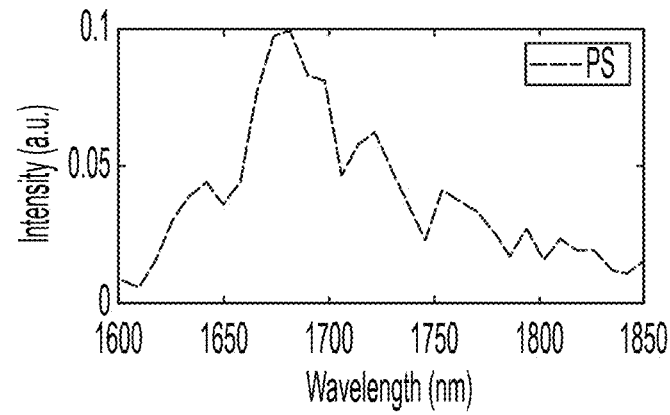
FIG. 13 illustrates a SWIP spectrum of polystyrene.

FIG. 13 illustrates a SWIP spectrum of polystyrene. Pump: 1600 nm to 1850 nm, 5 ns pulsed laser, generated by Opolette HE 355 LD (OPOTEK Inc). Probe: 1310 nm continuous wave laser.

Figures 15A, 15B:
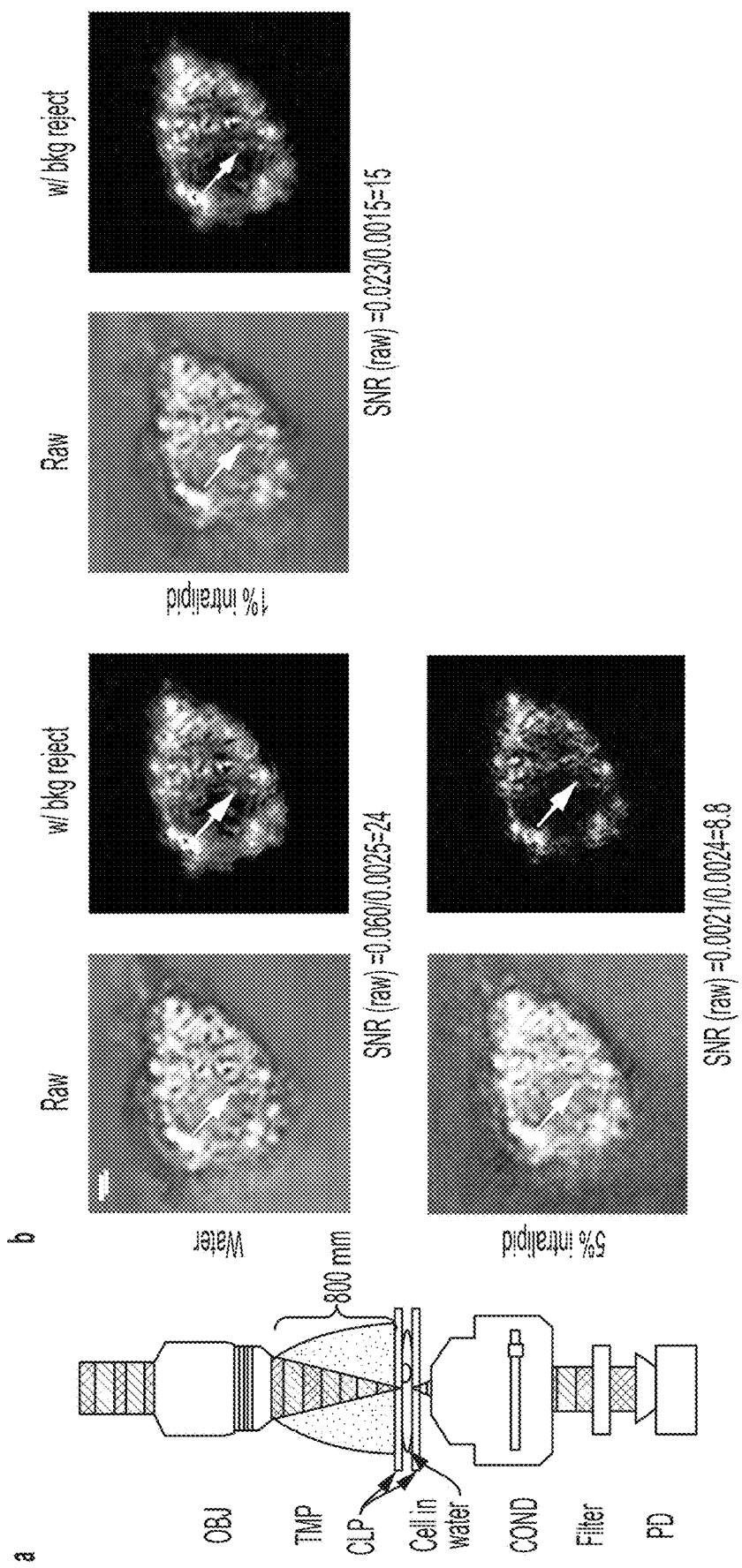
FIGS. 15(a) and 15(b) illustrate a background rejection test on OVCAR-5-cisR cells under a scattering medium. Specifically.

FIG. 14 illustrates a water background rejection workflow. For the cell image example here, the single-pixel lipid area has a fitting result of a=0.07 a.u., b=0.12 μs$^{-1}$, c=0.03 a.u., d=1.96 μs$^{-1}$. The decay coefficient threshold is set as 1.8 μs$^{-1}$. Scale bar: 20 μm FIGS. 15(a) and 15(b) illustrate a background rejection test on OVCAR-5-cisR cells under a scattering medium. Specifically, FIG. 15(a) illustrates a scattering phantom imaging schematic. OBJ: objective lens. TMP: tissue-mimicking phantom. CLP: Coverslip. COND: condenser. PD: photodiode. FIG. 15(b) illustrates SWIP imaging of cells and background rejection results through intralipid solution at different concentrations. The SNR is calculated from the lipid pointed by the white arrow. Laser power on sample: 1725 nm: 20 mW, 1310 nm: 8.5 mW. Scale bar: 5 m.

FIG. 16 illustrates SWIP and SRS benchmarking on a mouse brain slice. SWIP power on sample: 1725 nm: 20 mW, 1310 nm: 10.3 mW. SRS power on sample: 800 nm: 15 mW, 1040 nm: 80 mW. SRS dwell time: 10 s, 10 average. Scale bar: 20 m.

Figure 17A:
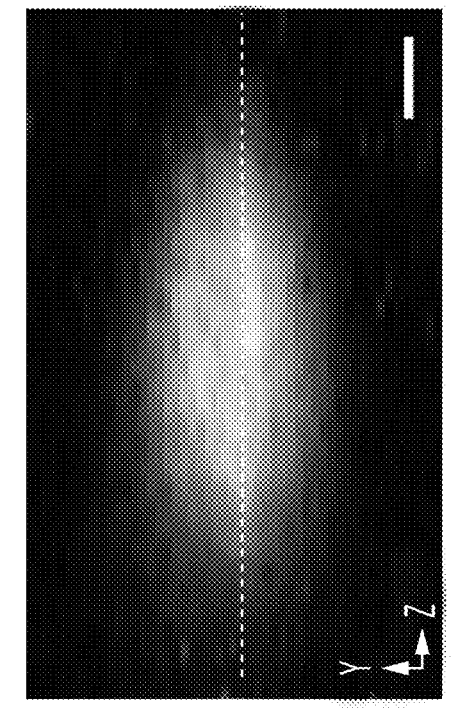
FIGS. 17(a)-17(d) illustrate a point spread function profile measured with long-working-distance objective. Specifically.
Figure 17B:
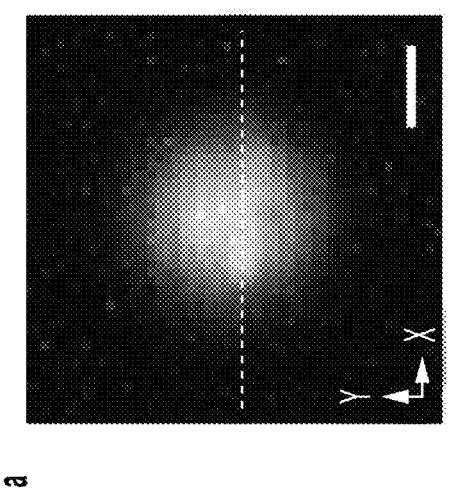
Figure 17C:
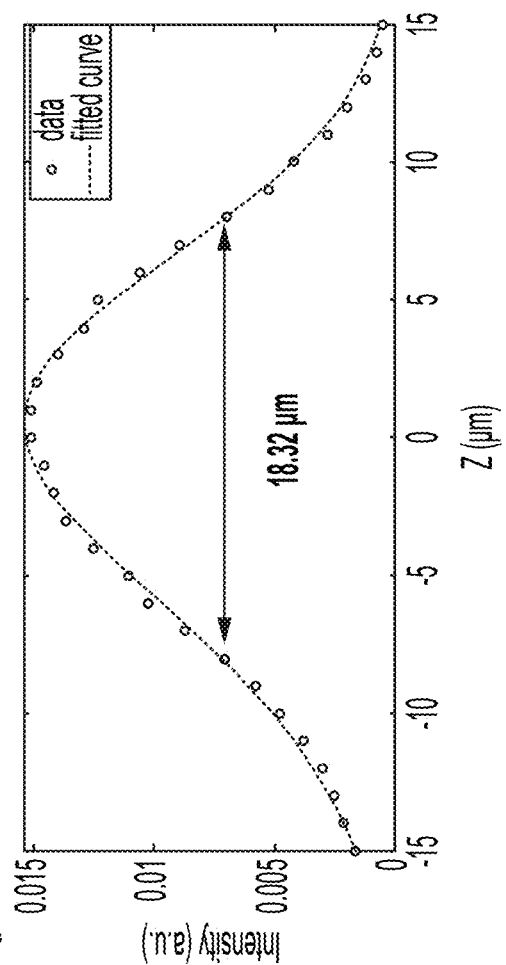
Figure 17D:
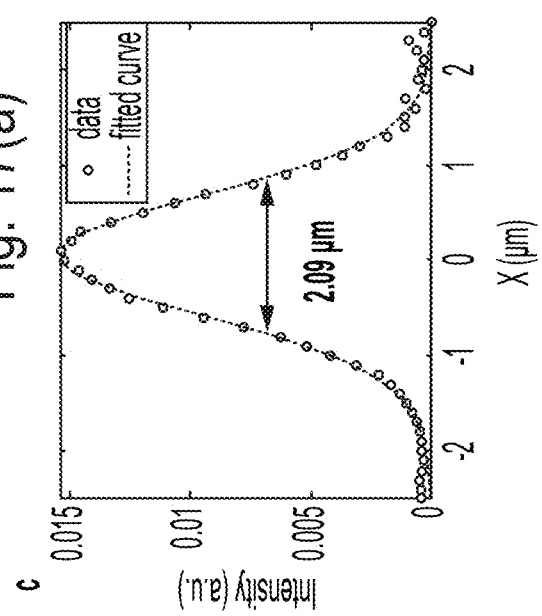

FIGS. 17(a)-17(d) illustrate a point spread function profile measured with long-working-distance objective. Specifically, FIGS. 17(a)-17(b) illustrate XY and YZ sections of volumetric SWIP image of single 500 nm PMMA bead. FIGS. 17(c)-17(d) illustrate single 500 nm PMMA bead's lateral and axial profile corresponding to dashed lines in FIGS. 17(a)-17(b). Excitation power on sample: 40 mW. Scale bar: 1 μm.

FIGS. 18(a)-18(b) illustrate an epi-detected SWIP microscope. Specifically, FIG. 18(a) includes a schematic functional block diagram of the epi-detected SWIP microscope. DM: Dichroic mirror. BS: Beam splitter. BP: Bandpass filter. PD: Photodiode. FIG. 18(b) illustrates epi-SWIP imaging of 1 μm PS beads under 800 μm-thick 1% intralipid. Scale bar: 5 μm. Power on sample: 1725 nm: 20 mW. 1310 nm: 53 mW.

TABLE 1

Absorption, scattering and attenuation data of 10% intralipid solution. $\mu_t = \mu_a + \mu_s$. $T_b = \exp(-\mu_t l)$ according to Beer-Lambert's law. $\mu_s$ is calculated using on a fitted model based on Mie scattering. $\mu_a$ is approximated with water absorption coefficients.

| Wavelength (nm) | Absorption coefficient $\mu_a$ (mm$^{-1}$) | Scattering coefficient $\mu_s$ (mm$^{-1}$) | Total attenuation coefficient $\mu_t$ (mm$^{-1}$) | Ballistic photon transmission through 800 μm phantom $T_b$ |
|---|---|---|---|---|
| 798 | 0.00233 | 27.50 | 27.50 | 2.8e−10 |
| 1040 | 0.02020 | 14.56 | 14.58 | 8.6e−06 |

TABLE 1-continued

Absorption, scattering and attenuation data of 10% intralipid solution. $\mu_t = \mu_a + \mu_s$. $T_b = \exp(-\mu_t l)$ according to Beer-Lambert's law. $\mu_s$ is calculated using on a fitted model based on Mie scattering. $\mu_a$ is approximated with water absorption coefficients.

| Wavelength (nm) | Absorption coefficient $\mu_a$ (mm$^{-1}$) | Scattering coefficient $\mu_s$ (mm$^{-1}$) | Total attenuation coefficient $\mu_t$ (mm$^{-1}$) | Ballistic photon transmission through 800 μm phantom $T_b$ |
|---|---|---|---|---|
| 1310 | 0.14891 | 8.369 | 8.517 | 0.0011 |
| 1725 | 0.62759 | 4.323 | 4.951 | 0.019 |

TABLE 2

Comparison of C-H bond concentration corresponding to SWIP LOD of DMSO, cellular lipid concentration and cellular protein concentration. Cellular lipid and cellular protein concentration is calculated from the data in literature.

| | Concentration (M) | Number of C-H bond per molecule | Corresponding C-H bond concentration (M) |
|---|---|---|---|
| SWIP LOD of DMSO | 0.112 | 6 | 0.224 |
| Cellular lipid | 0.0636 | 106 (estimated by dioleoylphosphatidylcholine) | 6.74 |
| Cellular protein | 0.00151 | 2332 (estimated by bovine serum albumin) | 3.52 |

The invention claimed is:

1. A short-wave infrared photothermal (SWIP) microscopy system for vibrational imaging of a sample, comprising:
a source of shortwave infrared light for generating shortwave infrared excitation light;
a source of probe light for generating probe light;
an optical combining element for combining the excitation light and the probe light to generate a combined beam;
an objective for receiving the combined beam and focusing the combined beam to generate a focused combined beam and directing the focused combined beam onto the sample to obtain a SWIP signal generated by absorption-induced thermo-optic selective heating of the sample;
a condenser for collecting the SWIP signal through an aperture in the condenser; and
a detection element for detecting the SWIP signal from the condenser.

2. The system of claim 1, wherein the source of probe light comprises a laser.

3. The system of claim 1, wherein the probe light is continuous wave (CW) light.

4. The system of claim 1, wherein the probe light has a wavelength in a range of 400 nm to 1500 nm.

5. The system of claim 4, wherein the probe light has a wavelength of 1310 nm.

6. The system of claim 1, wherein the source of the excitation light comprises a laser.

7. The system of claim 1, wherein the excitation light is pulsed.

8. The system of claim 1, wherein the excitation light has a wavelength in a range of 1000 nm to 2500 nm.

9. The system of claim 8, wherein the excitation light has a wavelength of 1730 nm.

10. A short-wave infrared photothermal (SWIP) microscopy method for vibrational imaging of a sample, comprising:
generating shortwave infrared excitation light;
generating probe light;
combining the excitation light and the probe light to generate a combined beam;
receiving the combined beam and focusing the combined beam to generate a focused combined beam;
directing the focused combined beam onto the sample to obtain a SWIP signal generated by absorption-induced thermo-optic selective heating of the sample;
collecting the SWIP signal through an aperture in a condenser; and
detecting the SWIP signal from the condenser.

11. The method of claim 10, wherein the source of probe light comprises a laser.

12. The method of claim 10, wherein the probe light is continuous wave (CW) light.

13. The method of claim 10, wherein the probe light has a wavelength in a range of 400 to 1500 nm.

14. The method of claim 13, wherein the probe light has a wavelength of 1310 nm.

15. The method of claim 10, wherein the source of the excitation light comprises a laser.

16. The method of claim 10, wherein the excitation light is pulsed.

17. The method of claim 10, wherein the excitation light has a wavelength in a range of 1000 nm to 2500 nm.

18. The method of claim 17, wherein the excitation light has a wavelength of 1730 nm.

* * * * *